(12) United States Patent
Ellis et al.

(10) Patent No.: US 10,045,087 B1
(45) Date of Patent: *Aug. 7, 2018

(54) SYSTEMS AND METHODS FOR PROVIDING PARENTAL CONTROL FEATURES IN VIDEO MOSAIC ENVIRONMENTS

(71) Applicant: Rovi Guides, Inc., Santa Clara, CA (US)

(72) Inventors: Michael D. Ellis, Boulder, CO (US); Jon P. Radloff, Castle Rock, CO (US); Charles D. White, Glen Mills, PA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/218,149

(22) Filed: Mar. 18, 2014

Related U.S. Application Data

(63) Continuation of application No. 11/510,247, filed on Aug. 24, 2006, now Pat. No. 8,719,857.

(Continued)

(51) Int. Cl.
*H04N 21/482* (2011.01)
*H04N 21/454* (2011.01)
(Continued)

(52) U.S. Cl.
CPC ....... *H04N 21/4821* (2013.01); *H04N 21/441* (2013.01); *H04N 21/454* (2013.01);
(Continued)

(58) Field of Classification Search
CPC ............. H04N 21/482; H04N 21/4532; H04N 21/25816; H04N 21/4821; H04N 21/441;
(Continued)

(56) References Cited

U.S. PATENT DOCUMENTS

| 2,700,065 A | 1/1955 | Evans |
| 2,851,550 A | 9/1958 | Searcy |

(Continued)

FOREIGN PATENT DOCUMENTS

| AU | B-21592/88 | 3/1989 |
| CN | 101194505 A | 6/2008 |

(Continued)

OTHER PUBLICATIONS

"Addressable Converters: A New Development at Cable Data," Via Cable, vol. 1, No. 12, Dec. 1981, Cable Data, Sacramento, California.

(Continued)

*Primary Examiner* — Benjamin R Bruckart
*Assistant Examiner* — Aklil M Tesfaye
(74) *Attorney, Agent, or Firm* — Haley Guiliano LLP

(57) ABSTRACT

Systems and methods for providing parental control support in video mosaic environment are disclosed. Upon receiving a request for a video mosaic page, screen data, which may include parental control information, is received. The screen data may identify the video assets in the video mosaic page. A determination is made whether the video assets in the video mosaic page are locked or unlocked by parental controls in force on the user equipment. Locked assets may be masked and individually unlocked upon verification of a parental control access code or PIN. Unlocked assets may be presented in cells, or windows, in the video mosaic page and may also be individually locked and subsequently masked. A separate set of parental control settings may be maintained for video mosaic pages or the mosaic parental control commands may be resolved with system parental control settings.

38 Claims, 16 Drawing Sheets

Related U.S. Application Data

(60) Provisional application No. 60/711,344, filed on Aug. 24, 2005.

(51) Int. Cl.
*H04N 21/45* (2011.01)
*H04N 21/475* (2011.01)
*H04N 21/441* (2011.01)

(52) U.S. Cl.
CPC ..... *H04N 21/4532* (2013.01); *H04N 21/4751* (2013.01); *H04N 21/4753* (2013.01)

(58) Field of Classification Search
CPC ............. H04N 21/454; H04N 21/4751; H04N 21/4753
See application file for complete search history.

(56) References Cited

U.S. PATENT DOCUMENTS

| | | | |
|---|---|---|---|
| 2,856,474 A | 10/1958 | Norris |
| 3,879,332 A | 4/1975 | Leone |
| 4,001,554 A | 1/1977 | Hall et al. |
| 4,012,583 A | 3/1977 | Kramer |
| 4,015,139 A | 3/1977 | Cleary et al. |
| 4,079,419 A | 3/1978 | Siegle et al. |
| 4,081,753 A | 3/1978 | Miller |
| 4,081,754 A | 3/1978 | Jackson |
| 4,156,850 A | 5/1979 | Beyers, Jr. |
| 4,162,513 A | 7/1979 | Beyers, Jr. et al. |
| 4,163,254 A | 7/1979 | Block et al. |
| 4,167,658 A | 9/1979 | Sherman |
| 4,170,782 A | 10/1979 | Miller |
| 4,225,884 A | 9/1980 | Block et al. |
| 4,228,543 A | 10/1980 | Jackson |
| 4,246,495 A | 1/1981 | Pressman |
| 4,247,743 A | 1/1981 | Hinton et al. |
| 4,288,809 A | 9/1981 | Yabe |
| 4,305,101 A | 12/1981 | Yarbrough et al. |
| 4,321,593 A | 3/1982 | Ho et al. |
| 4,348,696 A | 9/1982 | Beier |
| 4,355,415 A | 10/1982 | George et al. |
| 4,390,901 A | 6/1983 | Keiser |
| 4,425,579 A | 1/1984 | Merrell |
| 4,429,385 A | 1/1984 | Cichelli et al. |
| 4,482,789 A | 11/1984 | McVey |
| 4,484,217 A | 11/1984 | Block et al. |
| 4,484,220 A | 11/1984 | Beetner |
| 4,488,179 A | 12/1984 | Kruger et al. |
| 4,488,764 A | 12/1984 | Pfenning |
| 4,495,654 A | 1/1985 | Deiss |
| 4,510,623 A | 4/1985 | Bonneau et al. |
| 4,528,589 A | 7/1985 | Block et al. |
| 4,536,791 A | 8/1985 | Campbell et al. |
| 4,566,033 A | 1/1986 | Reidenouer |
| 4,573,072 A | 2/1986 | Freeman |
| 4,588,901 A | 5/1986 | Maclay et al. |
| 4,598,288 A | 7/1986 | Yarbrough et al. |
| 4,604,708 A | 8/1986 | Lewis |
| 4,605,964 A | 8/1986 | Chard |
| 4,605,973 A | 8/1986 | Von Kohorn |
| 4,620,229 A | 10/1986 | Amano et al. |
| 4,636,595 A | 1/1987 | Smock et al. |
| 4,647,735 A | 3/1987 | Sicher |
| 4,648,667 A | 3/1987 | Baumgart |
| 4,685,131 A | 8/1987 | Horne |
| 4,694,490 A | 9/1987 | Harvey et al. |
| 4,706,121 A | 11/1987 | Young |
| 4,718,107 A | 1/1988 | Hayes |
| 4,739,510 A | 4/1988 | Jeffers et al. |
| 4,750,213 A | 6/1988 | Novak |
| 4,768,229 A | 8/1988 | Benjamin et al. |
| 4,807,023 A | 2/1989 | Bestler et al. |
| 4,809,393 A | 3/1989 | Goodrich et al. |
| 4,823,385 A | 4/1989 | Hengendorfer |
| 4,855,611 A | 8/1989 | Isobe et al. |
| 4,862,268 A | 8/1989 | Campbell et al. |
| 4,885,775 A | 12/1989 | Lucas |
| 4,888,796 A | 12/1989 | Olivo, Jr. |
| 4,890,320 A | 12/1989 | Monslow et al. |
| 4,890,321 A | 12/1989 | Seth-Smith |
| 4,903,031 A | 2/1990 | Yamada |
| 4,930,158 A | 5/1990 | Vogel |
| 4,930,160 A | 5/1990 | Vogel |
| 4,965,825 A | 10/1990 | Harvey et al. |
| 4,977,455 A | 12/1990 | Young |
| 4,994,908 A | 2/1991 | Kuban et al. |
| 4,995,078 A | 2/1991 | Monslow et al. |
| 5,001,554 A | 3/1991 | Johnson et al. |
| 5,021,916 A | 6/1991 | Hubbard |
| 5,033,085 A | 7/1991 | Rew |
| 5,036,537 A | 7/1991 | Jeffers et al. |
| 5,038,211 A | 8/1991 | Hallenbeck |
| 5,045,947 A | 9/1991 | Beery |
| 5,046,125 A | 9/1991 | Takizawa |
| 5,051,837 A | 9/1991 | McJunkin |
| 5,053,797 A | 10/1991 | Samuels et al. |
| 5,053,884 A | 10/1991 | Kamijyo |
| 5,056,139 A | 10/1991 | Littlefield |
| 5,068,734 A | 11/1991 | Beery |
| 5,075,771 A | 12/1991 | Hashimoto |
| 5,119,507 A | 6/1992 | Mankovitz |
| 5,168,353 A | 12/1992 | Walker et al. |
| 5,172,111 A | 12/1992 | Olivo, Jr. |
| 5,206,722 A | 4/1993 | Kwan |
| 5,210,611 A | 5/1993 | Yee et al. |
| 5,223,924 A | 6/1993 | Strubbe |
| 5,231,310 A | 7/1993 | Oh |
| 5,235,415 A | 8/1993 | Bonicel et al. |
| 5,247,364 A | 9/1993 | Banker et al. |
| 5,253,066 A | 10/1993 | Vogel |
| 5,253,067 A | 10/1993 | Chaney et al. |
| 5,260,778 A | 11/1993 | Kauffman et al. |
| 5,303,063 A | 4/1994 | Kim et al. |
| 5,317,391 A | 5/1994 | Banker et al. |
| 5,357,276 A | 10/1994 | Banker et al. |
| 5,371,795 A | 12/1994 | Vogel |
| 5,384,910 A | 1/1995 | Torres |
| 5,396,546 A | 3/1995 | Remillard |
| 5,425,101 A | 6/1995 | Woo et al. |
| 5,446,488 A | 8/1995 | Vogel |
| 5,465,113 A | 11/1995 | Gilboy |
| 5,477,262 A | 12/1995 | Banker et al. |
| 5,485,221 A | 1/1996 | Banker et al. |
| 5,485,518 A | 1/1996 | Hunter et al. |
| 5,519,780 A | 5/1996 | Woo et al. |
| 5,544,354 A | 8/1996 | May et al. |
| 5,548,345 A | 8/1996 | Brian et al. |
| 5,550,575 A | 8/1996 | West et al. |
| 5,557,724 A | 9/1996 | Sampat et al. |
| 5,559,548 A | 9/1996 | Davis et al. |
| 5,579,055 A | 11/1996 | Hamilton et al. |
| 5,583,560 A | 12/1996 | Florin et al. |
| 5,583,576 A | 12/1996 | Perlman et al. |
| 5,585,838 A | 12/1996 | Lawler et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,619,274 A | 4/1997 | Roop et al. |
| 5,621,456 A | 4/1997 | Florin et al. |
| 5,629,733 A | 5/1997 | Youman et al. |
| 5,664,046 A | 9/1997 | Abecassis |
| 5,666,645 A | 9/1997 | Thomas et al. |
| 5,699,104 A | 12/1997 | Yoshinobu |
| 5,716,273 A | 2/1998 | Yuen |
| 5,751,335 A | 5/1998 | Shintani |
| 5,781,246 A | 7/1998 | Alten et al. |
| 5,805,763 A | 9/1998 | Lawler et al. |
| 5,815,145 A | 9/1998 | Matthews, III |
| 5,822,014 A | 10/1998 | Steyer et al. |
| 5,880,768 A | 3/1999 | Lemmons et al. |
| 5,900,868 A | 5/1999 | Duhault et al. |
| 5,903,314 A | 5/1999 | Niijima et al. |

(56) References Cited

U.S. PATENT DOCUMENTS

| | | | |
|---|---|---|---|
| 5,907,323 A | 5/1999 | Lawler et al. | |
| 5,917,492 A | 6/1999 | Bereiter et al. | |
| 5,973,683 A | 10/1999 | Cragun et al. | |
| 5,978,649 A | 11/1999 | Kahn | |
| 5,990,862 A | 11/1999 | Lewis | |
| 6,020,930 A | 2/2000 | Legrand | |
| 6,025,837 A | 2/2000 | Matthews, III et al. | |
| 6,061,097 A | 5/2000 | Satterfield | |
| 6,072,460 A | 6/2000 | Marshall et al. | |
| 6,108,365 A | 8/2000 | Rubin et al. | |
| 6,177,931 B1 | 1/2001 | Alexander et al. | |
| 6,240,555 B1 | 5/2001 | Shoff et al. | |
| 6,275,268 B1 | 8/2001 | Ellis et al. | |
| 6,295,646 B1 | 9/2001 | Goldschmidt Iki et al. | |
| 6,321,381 B1 | 11/2001 | Yuen et al. | |
| 6,331,877 B1 | 12/2001 | Bennington et al. | |
| 6,373,528 B1 | 4/2002 | Bennington et al. | |
| 6,405,371 B1 | 6/2002 | Oosterhout et al. | |
| 6,434,621 B1 | 8/2002 | Pezzillo et al. | |
| 6,456,334 B1 | 9/2002 | Duhault | |
| 6,519,011 B1 | 2/2003 | Shendar | |
| 6,563,515 B1 | 5/2003 | Reynolds et al. | |
| 6,564,378 B1 | 5/2003 | Satterfield et al. | |
| 6,637,029 B1* | 10/2003 | Maissel et al. | 725/46 |
| 6,661,468 B2 | 12/2003 | Alten et al. | |
| 6,671,424 B1 | 12/2003 | Skoll et al. | |
| 6,732,367 B1 | 5/2004 | Ellis et al. | |
| 6,732,371 B1 | 5/2004 | Lee et al. | |
| 6,751,401 B1 | 6/2004 | Arai et al. | |
| 6,757,906 B1 | 6/2004 | Look et al. | |
| 6,766,526 B1 | 7/2004 | Ellis | |
| 6,772,435 B1 | 8/2004 | Thexton et al. | |
| 6,785,904 B1 | 8/2004 | Franken et al. | |
| 6,804,824 B1 | 10/2004 | Potrebic et al. | |
| 6,865,746 B1 | 3/2005 | Herrington et al. | |
| 6,898,762 B2 | 5/2005 | Ellis et al. | |
| 6,938,208 B2 | 8/2005 | Reichardt | |
| 6,948,183 B1 | 9/2005 | Peterka | |
| 7,296,295 B2 | 11/2007 | Kellerman et al. | |
| 7,353,457 B2* | 4/2008 | Scheu et al. | 715/764 |
| 7,757,252 B1* | 7/2010 | Agasse | 725/41 |
| 8,276,176 B2 | 9/2012 | Ahmad-Taylor | |
| 2001/0031656 A1 | 10/2001 | Marshall et al. | |
| 2002/0010932 A1 | 1/2002 | Nguyen et al. | |
| 2002/0026638 A1 | 2/2002 | Eldering et al. | |
| 2002/0059593 A1 | 5/2002 | Shao et al. | |
| 2002/0078449 A1 | 6/2002 | Gordon et al. | |
| 2002/0157099 A1 | 10/2002 | Schrader et al. | |
| 2002/0166122 A1 | 11/2002 | Kikinis et al. | |
| 2003/0014752 A1 | 1/2003 | Zaslavsky et al. | |
| 2003/0110499 A1 | 6/2003 | Knudson et al. | |
| 2003/0159149 A1 | 8/2003 | Satterfield | |
| 2003/0204848 A1 | 10/2003 | Cheng et al. | |
| 2003/0217360 A1 | 11/2003 | Gordon et al. | |
| 2004/0040034 A1* | 2/2004 | Sullivan | H04N 5/4401 725/25 |
| 2004/0070593 A1 | 4/2004 | Neely et al. | |
| 2004/0117831 A1 | 6/2004 | Ellis et al. | |
| 2004/0210935 A1 | 10/2004 | Schein et al. | |
| 2005/0050070 A1 | 3/2005 | Sheldon | |
| 2005/0057699 A1* | 3/2005 | Bowser | H04N 5/4403 348/734 |
| 2005/0086069 A1 | 4/2005 | Watson et al. | |
| 2005/0165918 A1 | 7/2005 | Wantanabe et al. | |
| 2005/0235323 A1 | 10/2005 | Ellis et al. | |
| 2005/0251843 A1 | 11/2005 | Walker | |
| 2005/0283791 A1 | 12/2005 | McCarthy et al. | |
| 2006/0236342 A1 | 10/2006 | Kunkel et al. | |
| 2006/0282852 A1* | 12/2006 | Purpura | H04N 5/44543 725/39 |
| 2007/0011702 A1* | 1/2007 | Vaysman | 725/45 |
| 2007/0030391 A1 | 2/2007 | Kim et al. | |
| 2007/0055989 A1 | 3/2007 | Shanks et al. | |
| 2007/0154163 A1 | 7/2007 | Cordray | |
| 2007/0157237 A1 | 7/2007 | Cordray et al. | |
| 2007/0157249 A1 | 7/2007 | Cordray et al. | |
| 2007/0199015 A1 | 8/2007 | Lopez et al. | |
| 2007/0214478 A1 | 9/2007 | Feldstein et al. | |
| 2007/0220551 A1 | 9/2007 | Shanks et al. | |
| 2007/0250865 A1 | 10/2007 | Krakirian | |
| 2007/0294734 A1 | 12/2007 | Arsenault et al. | |
| 2008/0033992 A1 | 2/2008 | Sloo et al. | |
| 2008/0066103 A1 | 3/2008 | Ellis et al. | |
| 2008/0092157 A1 | 4/2008 | Walter et al. | |
| 2008/0147650 A1 | 6/2008 | Marsh | |
| 2008/0163059 A1 | 7/2008 | Craner | |
| 2008/0189740 A1 | 8/2008 | Carpenter et al. | |
| 2008/0276283 A1 | 11/2008 | Boyer et al. | |

FOREIGN PATENT DOCUMENTS

| | | |
|---|---|---|
| FR | 2 678 091 | 12/1992 |
| GB | 2 209 417 | 5/1989 |
| GB | 2 210 526 | 6/1989 |
| GB | 2 215 928 | 9/1989 |
| JP | 2008535411 | 8/2008 |
| WO | WO 86/01962 | 3/1986 |
| WO | WO 89/12370 | 12/1989 |
| WO | WO 90/15507 | 12/1990 |
| WO | WO 93/11638 | 6/1993 |
| WO | WO 93/11639 | 6/1993 |
| WO | WO 93/11640 | 6/1993 |
| WO | WO 96/37996 A1 | 11/1996 |
| WO | WO 98/26584 A1 | 6/1998 |
| WO | WO 98/56176 A1 | 12/1998 |
| WO | WO 99/03271 A1 | 1/1999 |
| WO | WO 99/04561 A1 | 1/1999 |
| WO | WO 99/56466 A1 | 11/1999 |
| WO | WO 00/05887 A1 | 2/2000 |
| WO | WO 00/08855 | 2/2000 |
| WO | WO 00/18114 | 3/2000 |
| WO | WO 00/033560 A2 | 6/2000 |
| WO | WO 00/33565 A2 | 6/2000 |
| WO | WO 02/45304 A2 | 6/2002 |
| WO | WO 02/054765 A1 | 7/2002 |
| WO | WO 02/087219 A2 | 10/2002 |
| WO | WO 03/026275 A2 | 3/2003 |
| WO | WO 04/047440 A2 | 6/2004 |
| WO | WO 06/081577 A2 | 8/2006 |
| WO | WO 06/105480 A1 | 10/2006 |
| WO | WO 08/024420 A2 | 2/2008 |
| WO | WO 08/082461 A1 | 7/2008 |

OTHER PUBLICATIONS

"A New Approach to Addressability," CableData product brochure, Cable Data, Sacramento, California, undated.

Brugliera, Vito, "Digital On-Screen Display—A New Technology for the Consumer Interface," Symposium Record Cable Sessions of the 18th International Television Symposium & Technical Exhibition, Jun. 1993, pp. 571-586.

CableComputer User's Guide, bearing a date of Dec. 1985 (Plaintiff's Exhibit 289).

CableData, Roseville Consumer Presentation, Mar. 1986.

Committee on Commerce, "Communications Act of 1995," XP-002100790 Jul. 1995, pp. 1-4.

Daniel F. Walsh Jr., Timing Considerations in RF Two Way Data Collection and Polling, Jerrold-Applies Media Lab, 1989 NCTA Technical Papers, pp. 47-56, 1989.

Daniel H. Smart, Innovative Aspects of a Switched Star Cabled Television Distribution System, British Cable Services Limited, 1987 NCTA Technical Papers, pp. 26-35, 1987.

Federal Communications Commission, In the Telecommunications Act of 1996, Public Law 104-104, effective Feb. 8, 1996, in Section 551, "Parental Choice in Television Programming," XP-002100791.

Gary Libman, Times Staff Writer Chaining the Channels, A New Generation of Television Blocking Systems Allows More Options for Parent, Seeking to Control Kids' Viewing, Los Angeles Times, Aug. 9, 1993.

Gregory F. Vaeth, John Feras, Enertec, Inc., The Addressable Controller of the Future, *General Instruments/Jerrold Communication*, 1990 NCTA Technical Papers, pp. 274-279, 1990.

(56) References Cited

OTHER PUBLICATIONS

Jerrold Communications Publication, "Cable Television Equipment," dated 1992 and 1993, pp. 8-2.1 to 8-6 and 8-14.1 to 8-14.3.
M/A-COM, Inc., "Videocipher II Satellite Descrambler Owner's Manual," dated prior to Feb. 1986.
Michael Dufresne, "New Services: An Integrated Cable Network's Approach, Videotron Communication LTEE," *Technical Papers of NCTA 31st Annual Convention & Exposition*, pp. 156-160 (1982).
Richard G. Merrell, Mack S. Daily, An Auto-Dialer Approach to Pay-Per-View Purchasing, Zenith Electronics Corporation, Glenview, Illinois, 1989 NCTA Technical Papers, pp. 34-38, 1989.
Roseville City Council Presentation, bearing a date of Mar. 13, 1985 (Defendant's Exhibit 26).
*StarSight Telecast Inc. User's Guide*, pp. 1-93 (1994).
T. Rzeszewski et al., "A Microcomputer Controlled Frequency Synthesizer for TV." Reprinted from *IEEE Trans. Consum. Electron*, vol. CE-24, pp. 145-153 (1978).
Videocipher Owner's Manual, M/A-Com., Publication No. 4096-048; Model No. VC-2000E or VC-2000E/B, undated.
"Weststar and Videotoken Network Present The CableComputer" (Plaintiff's Exhibit 334).
Family Safe Media, TV Guardian Summary, available at http://www.familysafemedia.com/tv_guardian/ tv_guardian_summary.html (printed Mar. 14, 2007).
Family Safe Media, Compare Profanity Filters, available at http://www.familysafemedia.com/compare_filters.html (printed Mar. 14, 2007).
"Focus Highlight for World Wide Web Frames", IBM Technical Disclosure Bulletin, Nov. 1997, pp. 89-90.
Singha, Edward Apurba, "An interactive solution for TV viewers," The Daily Star, Apr. 3, 2009, http//www.the dailystar.net/pf_story.php?nid=463, printed Apr. 2, 2009, 2 pps.
Tech Notes: Product Updates from M/A-COM Cable Home Group, "Videocipher Owner's Manual Update," Issue No. 6, Feb. 1986.

\* cited by examiner

SYSTEMS AND METHODS FOR PROVIDING PARENTAL CONTROL FEATURES IN VIDEO MOSAIC ENVIRONMENTS

CROSS-REFERENCE TO RELATED APPLICATIONS

This application is a continuation of U.S. patent application Ser. No. 11/510,247, filed Aug. 24, 2006 (now allowed), which claims the benefit of U.S. Provisional Patent Application No. 60/711,344, filed Aug. 24, 2005, each of which is hereby incorporated by reference herein in its respective entirety.

BACKGROUND OF THE INVENTION

This invention relates generally to media systems and, more particularly, to parental controls for media systems supporting video mosaics.

There are many devices in use in media systems today for controlling access to content (e.g., video or audio content) as a function of the nature of the content (e.g., the amount of sex or violence portrayed within the content). For example, using one common parental control technique, program content rating information may be sent along with a television signal (e.g., in the vertical blanking interval (VBI)) or stored in a program description database, and may be used to selectively block access to undesirable or unsuitable content.

The program content rating information may include ratings for broadcast programming (e.g., Motion Picture Association of America ratings such as G, PG, PG-13, R, and NC-17) as well as ratings of individual categories of program nature, such as violence, language, nudity, and sexual content. Generally, parental control systems today allow users to exclude or block content meeting or exceeding certain ratings criteria.

However, current parental control schemes have shortcomings. For example, due to the ever-increasing number of channels and services available in today's media systems, real-time video assets are being presented to users in a more user-friendly way. For example, remotely-generated video mosaics may present multiple video sources to a user in a single screen or page. For a description of one illustrative remotely-generated mosaic environment, called "Video-Rich Navigation" (VRN), see U.S. patent application Ser. No. 11/395,380, filed Mar. 30, 2006. Remotely-generated mosaics enable users to access services and/or assets from video-rich menu screens and displays. These screens and displays may include a number of video windows, or cells, which may be filled with digital video, digital or analog broadcast channels, or composite video streams (e.g., MPEG-2 streams composed of several digital channels). Current parental control devices fail to adequately support these video mosaic screens because the screens are typically composited from a number of different video sources. Each video source may be associated with its own parental control information, such as ratings information, making traditional parental control techniques incompatible or inadequate to support these mosaics.

Accordingly, it would be desirable to provide parental control systems and methods with enhanced support for video mosaic screens. It would also be desirable to provide systems and methods for supporting enhanced parental control functionality for the individual screen elements in any remotely-generated video mosaic page.

SUMMARY OF THE INVENTION

These and other objects of the invention are accomplished in accordance with the principles of the present invention by providing an interactive content control application (ICCA) implemented on standard user equipment. The ICCA supports the individual control (e.g., locking and unlocking) of cells within a video mosaic display or VRN screen.

Upon receiving and parsing real-time screen data provided to the user equipment, the ICCA may identify the content in each cell in a video mosaic screen. Cells that correspond to locked content (e.g., content exceeding a parental control ratings lock or violating a title or channel lock) may be masked with an icon, graphic, or blank area, while cells that correspond to unlocked content are displayed to the user.

Upon selecting a locked cell, the user is provided with an opportunity to unlock the cell and/or remove an existing parental control lock. After verifying a parental control access code, or PIN, several parental control options may then be presented to the user. These options may include unlocking the locked cell, unlocking the channel corresponding to the locked cell, unlocking the rating associated with the content in the locked cell, unlocking the title of the content in the locked cell, or any other suitable action. The ICCA may unlock cells permanently or for some user-defined or system-defined time (such as until the user tunes away from the video mosaic).

Upon selecting an unlocked cell, the user is provided with an opportunity to lock the cell and/or create a new parental control lock. Several parental control options may then be presented to the user. These options may include locking the unlocked cell, locking the channel corresponding to the unlocked cell, locking the rating associated with the content in the unlocked cell, locking the title of the content in the unlocked cell, or any other suitable action. The ICCA may lock cells permanently or for some user-defined or system-defined time.

In some embodiments, parental control locks created, removed, or configured from a video mosaic or VRN screen may be synchronized with some other parental control locks on the user equipment. For example, the ICCA may synchronize parental control mosaic locks with interactive media guidance application parental control locks. In other embodiments, two separate sets of parental control locks may be maintained. The user may resolve or synchronize the two sets of parental control locks at regularly-scheduled times or after some user event takes place on the user equipment.

In some embodiments, more than one video mosaic cell may be simultaneously selected. The user may then be given an opportunity to lock or unlock all selected cells. Alternatively or additionally, options may be presented to the user to lock all currently unlocked cells or unlock all currently locked cells. The ICCA may lock or unlock the cells permanently or for some user-defined or system-defined time.

BRIEF DESCRIPTION OF THE DRAWINGS

The above and other features of the present invention, its nature and various advantages will be more apparent upon consideration of the following detailed description, taken in conjunction with the accompanying drawings, in which.

DETAILED DESCRIPTION OF THE PREFERRED EMBODIMENTS

The systems and methods described herein are directed toward providing enhanced parental control functionality. Although the described embodiments may refer to Video-Rich Navigation (VRN) screens, displays, pages, and/or environments, the present invention may be used with any remotely-generated or locally-generated video mosaic screens. In addition, although the windows or cells of the mosaic pages are described herein as being populated with analog or digital video from broadcast television channels, the windows or cells of the mosaic pages may be populated with any suitable video assets. These video assets may include live broadcast programs, video on-demand (VOD) assets, pay-per-view (PPV) assets, recorded assets (e.g., from a digital video recorder, or DVR), locally stored assets, advertising, websites, previews, Webcasts, interactive games and applications, or any other suitable content. The cells may contain full-motion video, audio, still images, text, icons, logos, or any combination of these (or any other suitable) elements.

Figure 1:
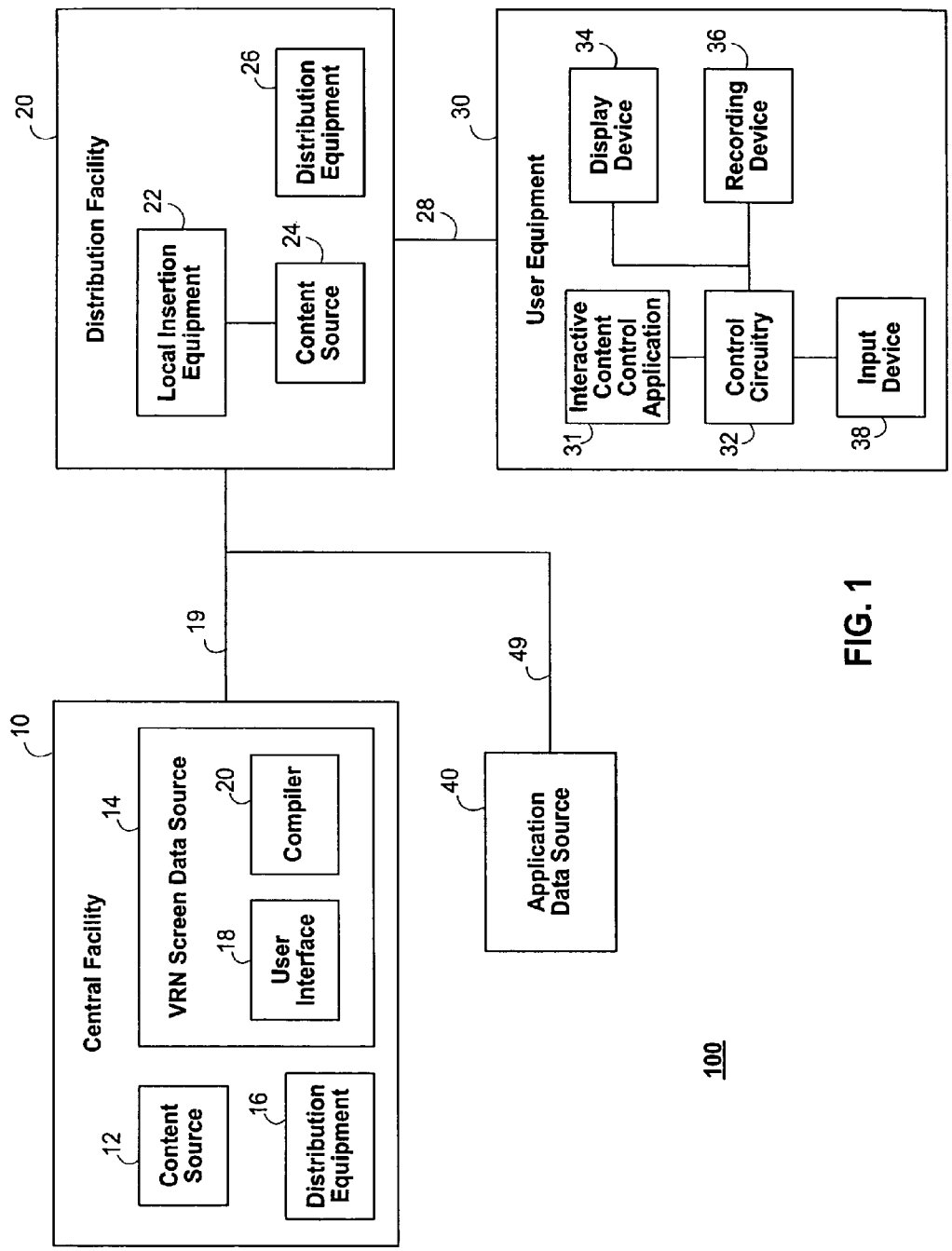
FIG. 1 is a diagram of an illustrative interactive media system in accordance with one embodiment of the invention.

FIG. 1 shows illustrative media system architecture 100 for providing parental control support in a VRN environment in accordance with one embodiment of the invention. Central facility 10 may include content source 12, VRN screen data source 14, and distribution equipment 16. Content source 12 may include any equipment suitable for producing or generating VRN screens. The video content from content source 12 may be in analog or digital form. In other embodiments, content source 12 may be in a facility other than central facility 10, and may also provide content for distribution as regular television channels (e.g., broadcast programming, VOD content, etc.).

VRN screen data source 14 may be any equipment suitable for generating VRN screen data. For example, VRN screen data source 14 may be a personal-computer (PC) based system or a workstation. User interface 18 may be any suitable interface, such as a Windows-based or Unix-based graphic user interface (GUI), which allows, for example, an operator to define VRN definitional files and synchronize the VRN screen data of the definitional files with content from content source 12. The user interface may allow an operator to, for example, specify transitions between distinct configuration specifications for selectable items in synchronization with video content. The user interface may also allow an operator to define control data which controls, inter alia, the appearance, functionality, and interactivity of the screen elements, as well as the content or asset displayed in a screen element.

The screen data may also include parental control information. For example, content from content source 12 may be associated with one or more ratings (e.g., MPAA or television ratings). This parental control information may be included in the screen data by VRN screen data source 14. Other parental control information that may be included in the screen data may include the source of the video content (e.g., channel), its title, and any other suitable information that may be required to determine if the content violates parental control settings. In some embodiments, a unique identifier may be included in the screen data. From this unique identifier, parental control information may be derived locally without the need to transmit all the parental control information in the screen data. See FIG. 13, below, for an illustrative parental control data structure for use by VRN screen data source 14. Compiler 20, which may include any suitable combination of hardware and software, compiles or translates the VRN screen data of the definitional files into another format, such as binary, XML, or HTML format. In some embodiments, input from user interface 18 may be used to directly generate the screen data without need for compiler 20.

Distribution equipment 16 may be any suitable equipment for distributing VRN screens from content source 12 and VRN screen data from VRN screen data source 14 over communications path 19 to distribution facility 20, and further over communication path 28 for distribution to user equipment 30. Central facility 10 may distribute the screens and screen data to multiple distribution facilities 20, but only one has been shown to avoid over-complicating the drawing. In other embodiments, central facility 10 may distribute the VRN screens and screen data to users at user equipment 30 directly. Distribution equipment 16 may distribute the VRN screens and VRN screen data in any suitable analog or digital format and over any suitable communications path (e.g., satellite or terrestrial broadcast, the Internet, etc.). VRN screen data may be distributed in-band or out-of-band from the VRN screens.

Distribution facility 20 may be any facility (e.g., a cable headend) suitable for receiving the VRN screens and screen data and distributing the screens and screen data to user equipment 30. There may be multiple users at multiple instances of user equipment 30, but only one instance of user equipment has been shown to avoid over-complicating the drawing. Distribution facility 20 may include local insertion equipment 22 and content source 24 for allowing a local operator to insert content and data into the VRN screens or VRN screen data, respectively, and compile VRN screen data into binary format for transmission (if required). Local insertion equipment 22 may run, for example, a local version of user interface 18 and compiler 20.

Distribution equipment 26 may distribute the VRN screens and VRN screen data in any suitable analog or digital format and over any suitable communications path to user equipment 30 (e.g., broadcast, cable, or the Internet.). The communication paths 19, 49, and 28 may include, for example, a satellite path, a fiber-optic path, a cable path, an Internet path, or any other suitable wired or wireless path. For example, VRN screens may be provided as MPEG-2 feeds. Distribution equipment 26 may provide the VRN screens (and the VRN screen data) as tunable analog or digital channels, or as VOD streams (both of which are referred to herein as VRN channels). The VRN channels provide the users of user equipment 30 with a set of interactive features that make up a VRN application.

In some embodiments, distribution facility 20 may provide the VRN channel full-time over a given analog or digital channel. Alternatively, distribution facility 20 may provide VRN channels on-demand or during specific time intervals.

Distribution facility 20 may provide one or more VRN applications to user equipment 30. A VRN application may include a set of VRN screens, buttons, and associated functionality. For example, FIG. 4, described in more detail below, shows a homepage display screen associated with an illustrative VRN application.

User equipment 30 may include any equipment suitable for providing an interactive media experience and for implementing the VRN applications provided by distribution facility 20. User equipment 30 may include television equipment such as a television, set-top box, recording device, video player, user input device (e.g., remote control, keyboard, mouse, touch pad, touch screen, or voice recognition interface), or any other device suitable for providing an interactive multimedia experience. For example, user equipment 30 may include a DCT 2000, 2500, 5100, 6208 or 6412 set-top box provided by Motorola, Inc. In some embodiments, user equipment 30 may include computer equipment, such as a personal computer with a television card (PCTV). In some embodiments, user equipment 30 may include a gaming system, a portable electronic device, such as a portable DVD player, a portable gaming device, a cellular telephone, a PDA, a music player (e.g., MP3 player), or any other suitable portable or fixed device.

In the example of FIG. 1, user equipment 30 includes at least control circuitry 32, display device 34, recording device 36, user input device 38, and interactive content control application (ICCA) 31, which may be implemented as separate devices or as a single device. A VRN client may also implemented on user equipment 30 to receive, execute, and support VRN applications.

Control circuitry 32 is adapted to receive user input from input device 38 and execute the instructions of the VRN client, ICCA 31, and any other interactive applications running on user equipment 30. Control circuitry 32 may include one or more tuners (e.g., analog or digital tuners), decoders (e.g., MPEG decoders), processors (e.g., Motorola 68000 family processors), memory (i.e., RAM and hard disks), communications circuitry (e.g., cable modem circuitry), input/output circuitry (e.g., graphics circuitry), connections to the various devices of user equipment 30, and any other suitable component for providing analog or digital media programming and interactive media features. In one embodiment, control circuitry 32 may be included as part of one of the devices of user equipment 30 such as, for example, part of recording device 36, display device 34, or any other suitable device (e.g., a set-top box, television, video player, etc.).

Display device 34 may include any suitable device such as, for example, a television monitor, an LCD screen, a computer monitor, or a display incorporated in user equipment 30 (e.g., a cellular telephone display or music player display). Display device 34 may also be configured to provide for the output of audio and/or other sensory output (e.g., a holographic projector or virtual reality simulator).

Recording device 36 may be a personal video recorder (PVR), digital video recorder (DVR), video cassette recorder (VCR), DVD-recorder, or any other suitable recording device. Recording device 36 may include one or more tuners.

The VRN client implemented on user equipment 30 and ICCA 31 may be stand alone applications or part of an interactive application, such as an interactive media guidance application (IMGA) or interactive program guide (IPG). One or more of the interactive applications may receive interactive application data from application data source 40. As shown in FIG. 1, the data may be received via distribution facility 20 over communication path 49. Alternatively, the data may be received by user equipment 30 from application data source 40 over a direct communication path (not shown). Application data source 40 may also be part of central facility 10 or distribution facility 20. In some embodiments, the interactive application data may include elements that are referenced in the VRN screen data for inclusion in the VRN application such as graphics, logos, advertising, and the like. VRN templates, for example, may be provided as part of the interactive television application data.

Homepages (and other VRN screens or pages) delivered to user equipment 30 may include a number of interactive elements. Interactive elements may be highlighted and selected. If the user navigates to a specific interactive element (e.g., by using the arrow keys on a remote control device), the interactive element may be visually highlighted in some fashion (e.g., a colored border may appear around the element). If the user selects a highlighted interactive element (e.g., by pressing the "OK" button on a remote control device), the system may display a specific tunable channel, VOD clip, VOD screen, or another interactive application screen, based on selection behavior specified for the interactive element in the VRN screen data.

ICCA 31 may support the VRN client implemented on user equipment 30 to provide enhanced parental control functionality for VRN screens and pages. For example, ICCA 31 may parse received VRN screen data to identify the rating of each element in a VRN screen. As another example, ICCA 31 may determine the channel, source, or title of each video asset in a VRN screen to support channel, source, and title locks (described in more detail below). Upon selecting an interactive element within a VRN screen, ICCA 31 may display (or cause the VRN client to display) various parental control options. These options allow a user to create, remove, and configure various parental control locks for the individual elements of the VRN page.

In some embodiments, ICCA 31 resolves VRN parental control locks with another set of parental control locks (e.g., system-wide or user equipment parental control locks established via an IMGA). In these embodiments, ICCA 31 may send parental control commands to another interactive application (e.g., an IMGA) at regular intervals. These locks may be synchronized in real-time or resolved in batch at a user-defined or system-defined time (e.g., 2 AM every morning). In other embodiments, only one set of parental control locks is maintained on user equipment 30 and all configuration changes are immediately resolved or synchronized.

Although, in the illustrated embodiment of FIG. 1, ICCA 31 is internal to user equipment 30, ICCA 31 may be implemented externally or partially implemented externally to user equipment 30. For example, ICCA 31 may be implemented at central facility 10 or distribution facility 20 and may run using a client-server or distributed architecture where some of the application is implemented locally on user equipment 30 in the form of a client process and some of the application is implemented at a remote location in the form of a server process. ICCA 31 may also be implemented on any suitable server, computer equipment, or set-top box accessible by user equipment 30.

Figure 2:
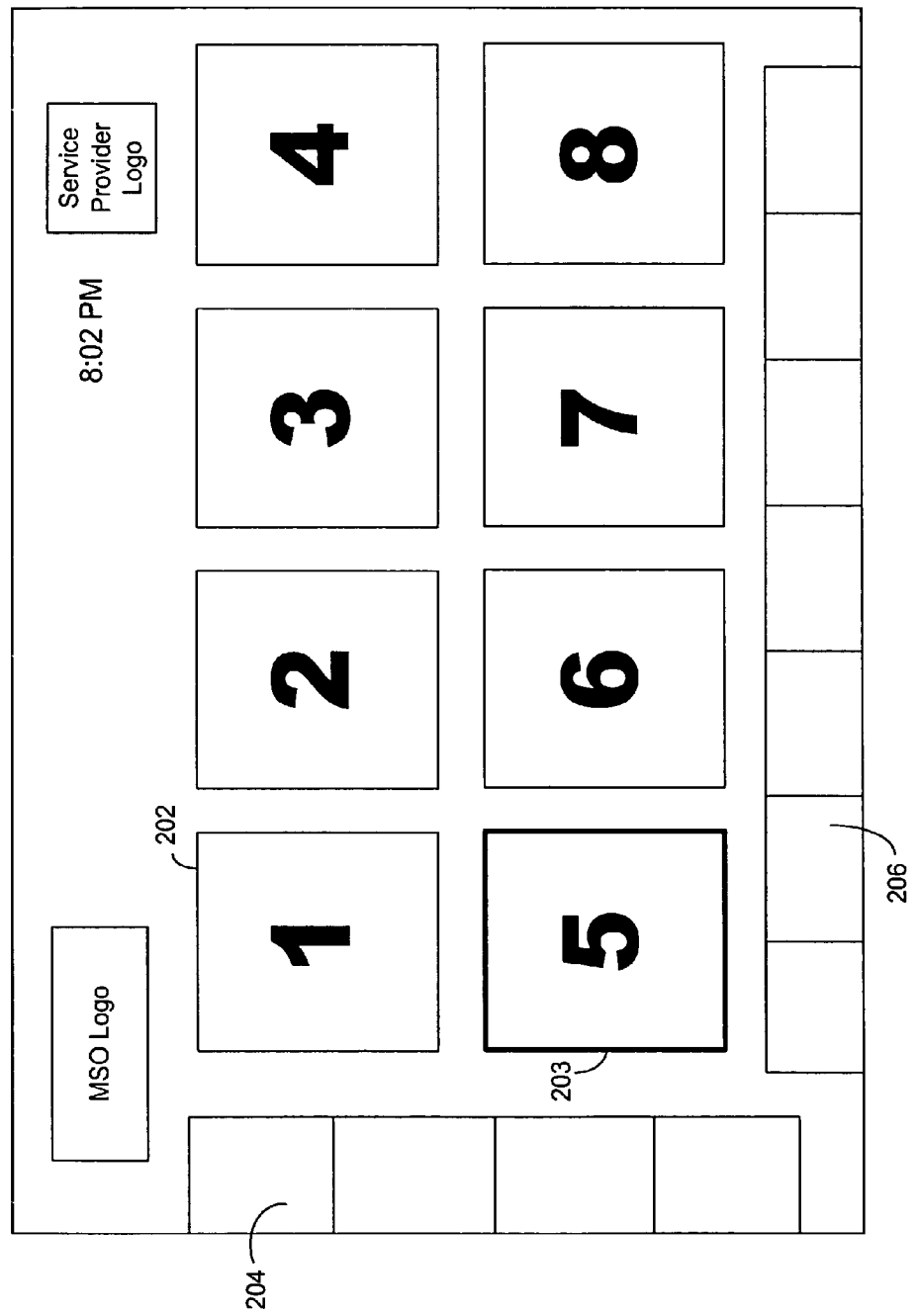
FIG. 2 is an illustrative display screen showing a number of video windows, or cells, in accordance with one embodiment of the invention.

FIG. 2 shows illustrative VRN display screen 200 in accordance with one embodiment of the invention. In the example of FIG. 2, screen 200 contains eight numbered cells, or windows. Each of these eight cells may be populated with a different asset or channel. For example, cell 202 may include full-motion video from channel 225 Cinemax while cell 203 may contain promotional advertising for new VOD movie releases. Each of the cells in display 200 may be individually selected using input device 38 (FIG. 1). For example, the user may highlight a cell in display 200 using the arrow or cursor keys on a remote control. In the example of FIG. 2, cell 203 is currently highlighted, as evidenced by the darkened border around the cell. One or more cells may be simultaneously selected, if desired. For example, upon pressing an "OK" key on input device 38 (FIG. 1), the selected status of a cell may toggle on and off. The user may then select one or more additional cells in the same manner.

The number, location, size, and shape of the cells in display 200 may be altered without departing from the spirit of the invention. As described above, screen data may be used to define the elements in a VRN page. This data may define more or less than eight cells and cells of different sizes, positions, and shapes than those shown in FIG. 2. In some embodiments, the properties of the cells in display 200 are customizable by the user. For example, the VRN client may support variable-sized cells, and the user may drag a corner of a cell using input device 38 (FIG. 1) to increase or decrease the size of the cell. Similarly, a user may reshape a cell in one or more dimensions by dragging a cell boundary other than a corner. The VRN client may also permit cell positions to be altered in real-time while video assets are playing. For example, a user may drag one or more cells to new locations or rearrange the placement of the cells to further customize the page.

VRN display screen 200 may also include one or more of vertical option buttons 204 and horizontal option buttons 206. These buttons may link screen 200 to other VRN screens, the main IMGA screen, or perform any suitable functionality. For example, one button may select all the numbered cells in screen 200, while another button may deselect all the numbered cells in screen 200.

Figure 3:
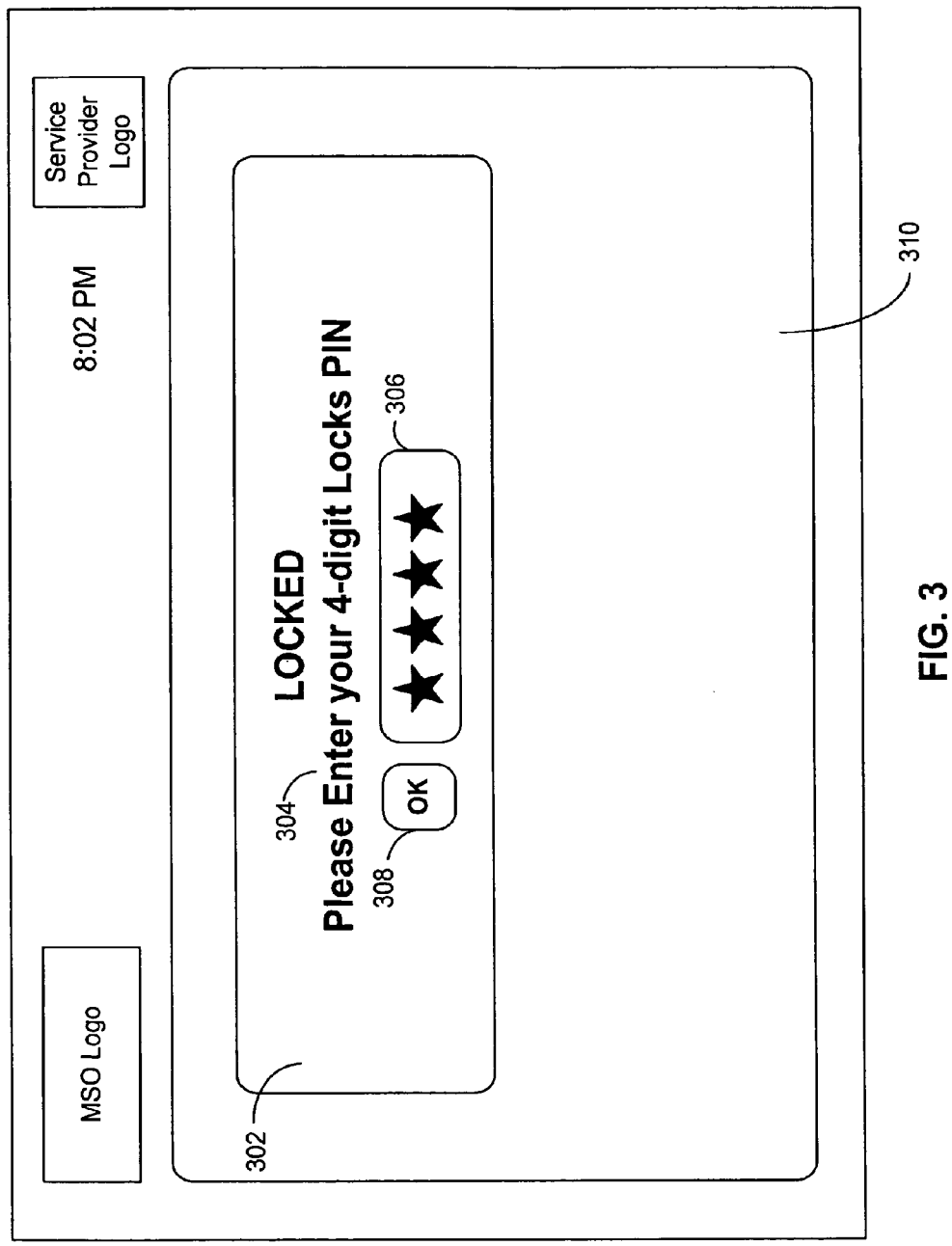
FIG. 3 is an illustrative display screen showing an administrative parental control access code prompt in accordance with one embodiment of the invention.

FIG. 3 shows illustrative display 300 prompting the user to enter a parental control access code, or PIN, in accordance with one embodiment of the invention. Prompt 302 may include PIN entry message 304, PIN entry field 306, and "OK" button 308. Message 304 may instruct the user to enter a four-digit numeric PIN. In some embodiments, parental control access codes may be alphanumeric and may be shorter or longer than four digits. A user may enter a parental control access code into PIN entry field 306 using input device 38 (FIG. 1). User may also be authenticated by other means. For example, a voice recognition/verification module may be implemented on the user equipment to authenticate via voice. Similarly, an iris or thumbprint scanner or external smartcard reader may provide authentication in lieu of prompt 302.

Prompt 302 may be displayed to the user at various times. For example, the user may be required to enter a valid parental control access code before being permitted to access a VRN homepage, such as screen 400 of FIG. 4, described below. As another example, prompt 302 may be displayed to a user whenever the user attempts to access a parental control setup page, such as screen 500 of FIG. 5, described below. A user may also be required to input a valid parental control access code before accessing locked content or performing any parental control functionality (e.g., removing, adding, disabling, or enabling a parental control lock).

Prompt 302 may also include a default time-out value, whereby prompt 302 is removed from display 300 after the expiration of some user-defined or system-defined number of seconds (e.g., 15 seconds). This prevents prompt 302 from permanently covering the content displayed in main window 310. In some embodiments, when the content in main window 310 is parentally controlled, prompt 302 may not be automatically removed and the underlying content may be blocked until the user has entered the correct PIN in PIN entry field 306. The content in main 310 may include a broadcast television channel, a program listing screen of an IMGA, full-motion VOD or PPV content, an interactive application or game, or any other suitable content or combination of different types of content from which a locked screen or content selection may be accessed.

Upon selecting button 308, the ICCA verifies the parental control access code and either permits access to the locked screen or content or invites the user to reenter a valid parental control access code. In some embodiments, after attempting to input a parental control access code a predefined number of times, the ICCA locks all further parental control access code input attempts for a certain amount of time (e.g., 30 minutes). This may deter children and other unauthorized users from randomly guessing parental control access codes.

Figure 4:
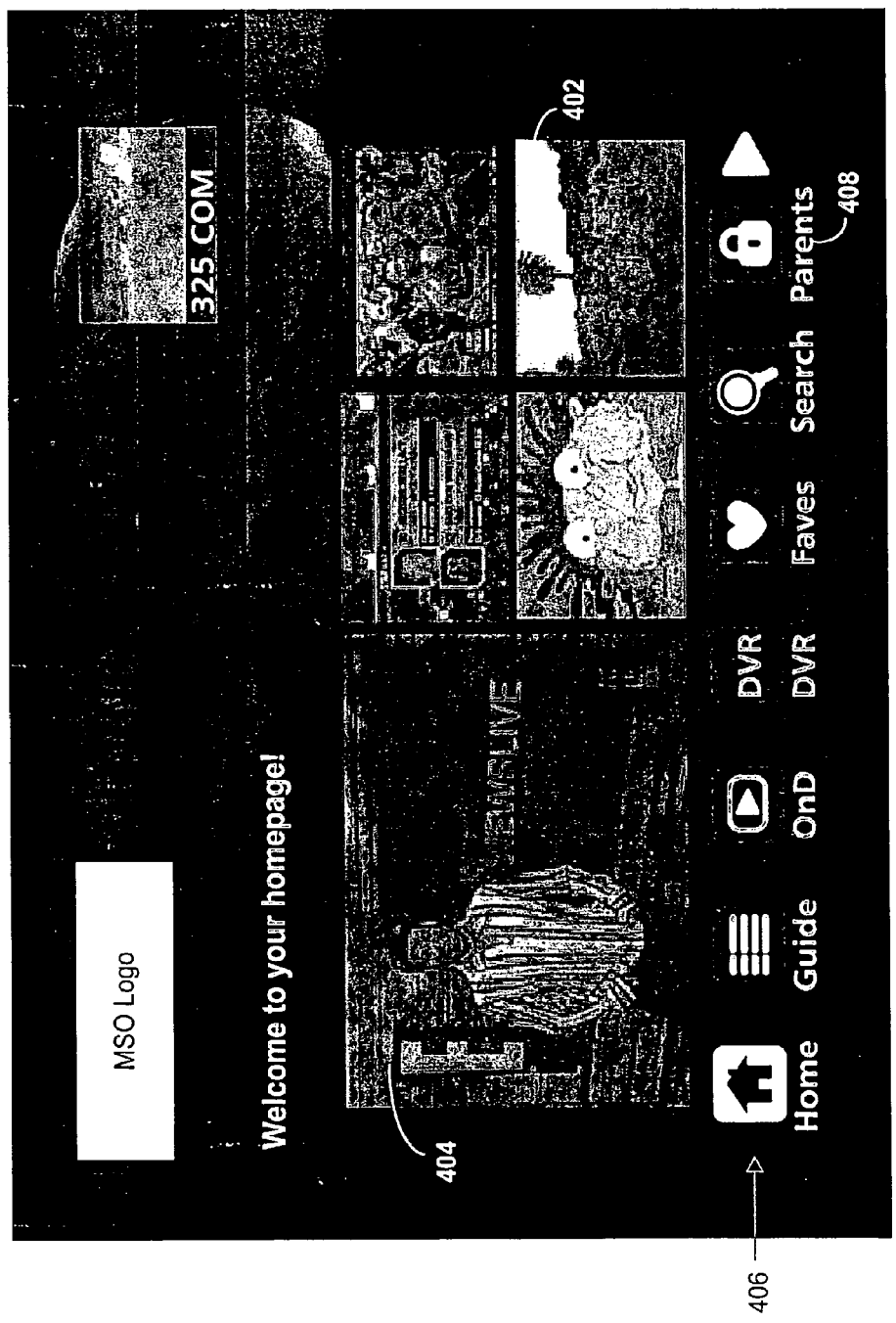
FIG. 4 is an illustrative display screen showing a VRN homepage with a parental control access button in accordance with one embodiment of the invention.

FIG. 4 shows illustrative VRN homepage 400 in accordance with one embodiment of the invention. In some embodiments, homepage 400 is accessible through a particular digital television channel. A user may also be presented with homepage 400 after selecting an appropriate button on input device 38 (FIG. 1). For example, a "Home Page" button may provide direct access to homepage 400. In some embodiments, homepage 400 may be optionally locked, requiring a valid parental control access code input (e.g., via prompt 302 of FIG. 3) in order to view the page. Homepage 400 may include main cell 404, one or more thumbnail cells 402, and option buttons 406. Main cell 404 and thumbnail cell 402 may both be VRN cells, capable of displaying full-motion video. In some embodiments, main cell 404 is approximately four times larger in size than thumbnail cell 402.

Figure 5:
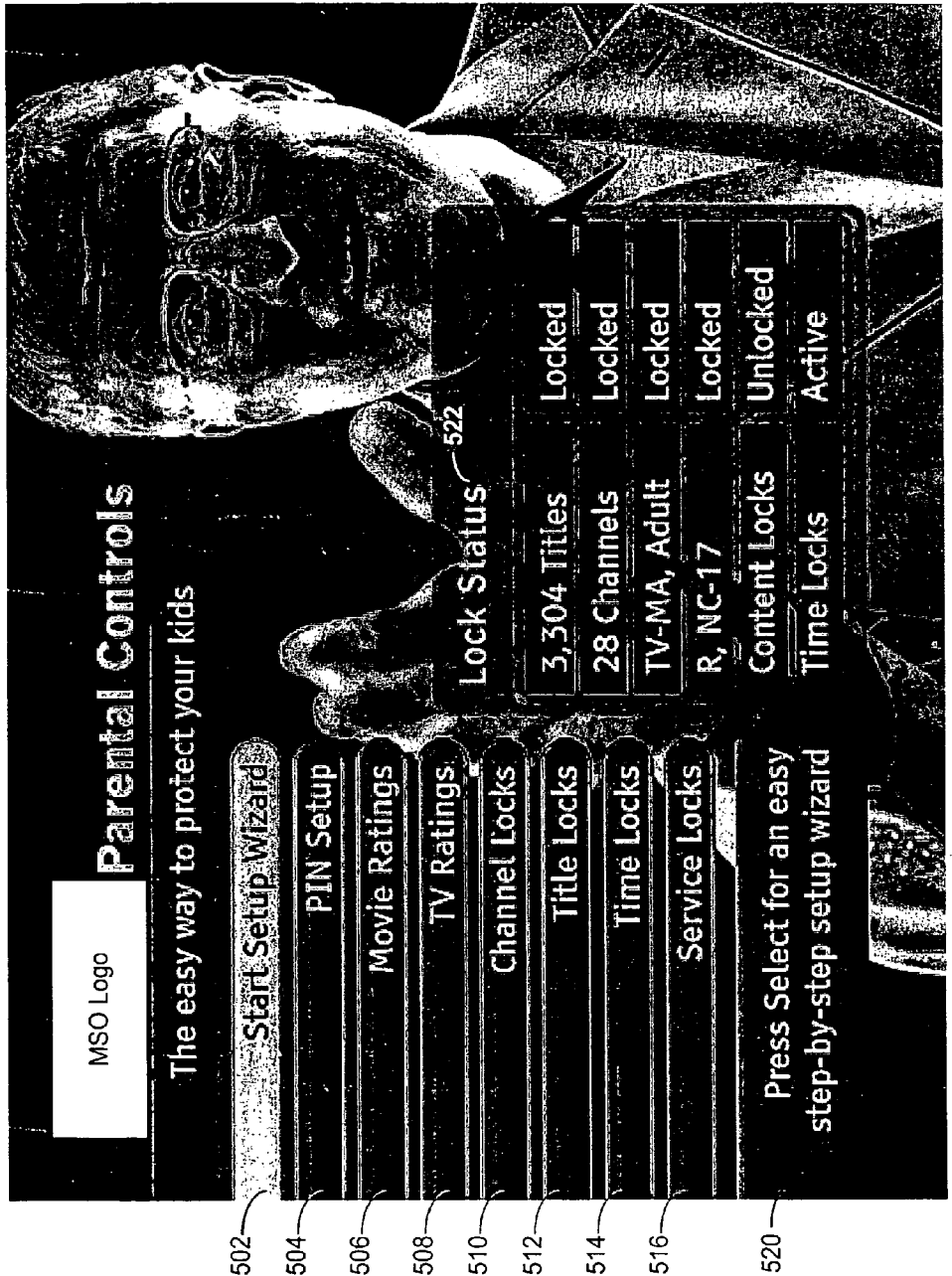
FIG. 5 is an illustrative display screen showing a parental control locks setup menu and quick view overlay in accordance with one embodiment of the invention.

Options buttons 406 may include single-selection access to a variety of commonly-used features. For example, button 408 may be selected to access parental control features. Upon selecting button 408, a parental control setup screen may be displayed, such as screen 500 of FIG. 5. In FIG. 5, the menu of parental control setup screen 500 may include a list of selectable, parental control options 502-516. It may also include "quick view" menu 522, which shows the current status of parental control locks. In the example of FIG. 5, quick view status menu 522 informs the user of the number of titles and channels locked, the TV and movie ratings locked, and whether content locks and time locks are active. Quick view status menu 522 may include more or less detailed parental control status information, if desired. Display screen 500 may also include help area 520, which may convey helpful information, instructions, or suggestions to the user.

Content locks allow the user to lock assets based on the type of content in a program. For example, a user may lock programs containing one or more of violence, sexual situations, coarse language, and suggestive dialogue. Content locks may also allow the user to lock assets based on one or more content advisories associated with an asset. For example, a user may lock programs associated with such content advisories as brief nudity, strong language, and graphic violence. Content advisories may be assigned by a programmer or by a public or private organization or government agency (e.g., the Film Advisory Board or the MPAA). Content locks may apply to assets regardless of the assets' ratings. Program content may be locked by selecting the start setup wizard option using option 502.

In response to the user selecting option 502, shown highlighted in the example of FIG. 5, the user may be presented with a parental control wizard that takes the user step-by-step through the different parental control settings. For example, the wizard may include eight steps, providing one or more interactive display screens at each step. During an illustrative first display, the user may setup a parental control access code. Additional subsequent displays may include, for example, one or more screens for setting parental control options by movie ratings, one or more screens for setting parental control options by TV ratings, one or more screens for setting parental control options by channel, one or more screens for setting parental control options by title, one or more screens for setting parental control options by time, one or more screens for setting parental control options by service, and one or more screens for setting parental control options by content. Each of these screens may include help text explaining the relevance and effect of a particular parental control setting and prompts asking the user to set the various parental control settings. In the example of FIG. 5, the parental control setup wizard also includes video of a talking head in the background. The video helps guide the user through the parental control setup process.

Upon selecting PIN setup option 504, the user may create or change the user's parental control access code. Upon selecting movie ratings option 506, the user is presented with one or more screens of movie ratings lock options. For example, the user may select which movie ratings (e.g., from G, PG, PG-13, R, and NC-17) to lock. Upon selecting television ratings option 508, the user is presented with one or more screens of television ratings lock options. For example, the user may select which television ratings (e.g., from TV-Y, TV-Y7, TV-G, TV-PG, TV-14, and TV-MA) to lock.

Upon selecting channel locks option 510, the user is presented with one or more screens of channel lock options. For example, the user may select which television channels to lock. Upon selecting title locks option 512, the user is presented with one or more screens of title lock options. Title locks may lock more than one asset. For example, creating a title lock of "The Jerry Springer Show" may lock all episodes of the show on all channels.

Upon selecting time locks option 514, the user is presented with one or more screens of time lock options. For example, the user may select a time period to lock access to all content or content of a particular rating. Finally, service locks option 516 allows a user to lock one or more services accessible via the user equipment. For example, the user equipment may support access to VOD services, PPV service, and gaming services. Some of these services may be provided at an additional charge to the user. As another example, the user equipment may support direct access to the Internet. By creating a new service lock, Internet access may be locked.

Although parental control setup screen 500 lists the most common parental control locks in options 508-516, in other embodiments, another suitable combination of parental control locks may be included in parental control setup screen 500. For example, genre locks, director locks, and actor locks may be supported and displayed as selectable options in parental control setup screen 500.

Figure 6:
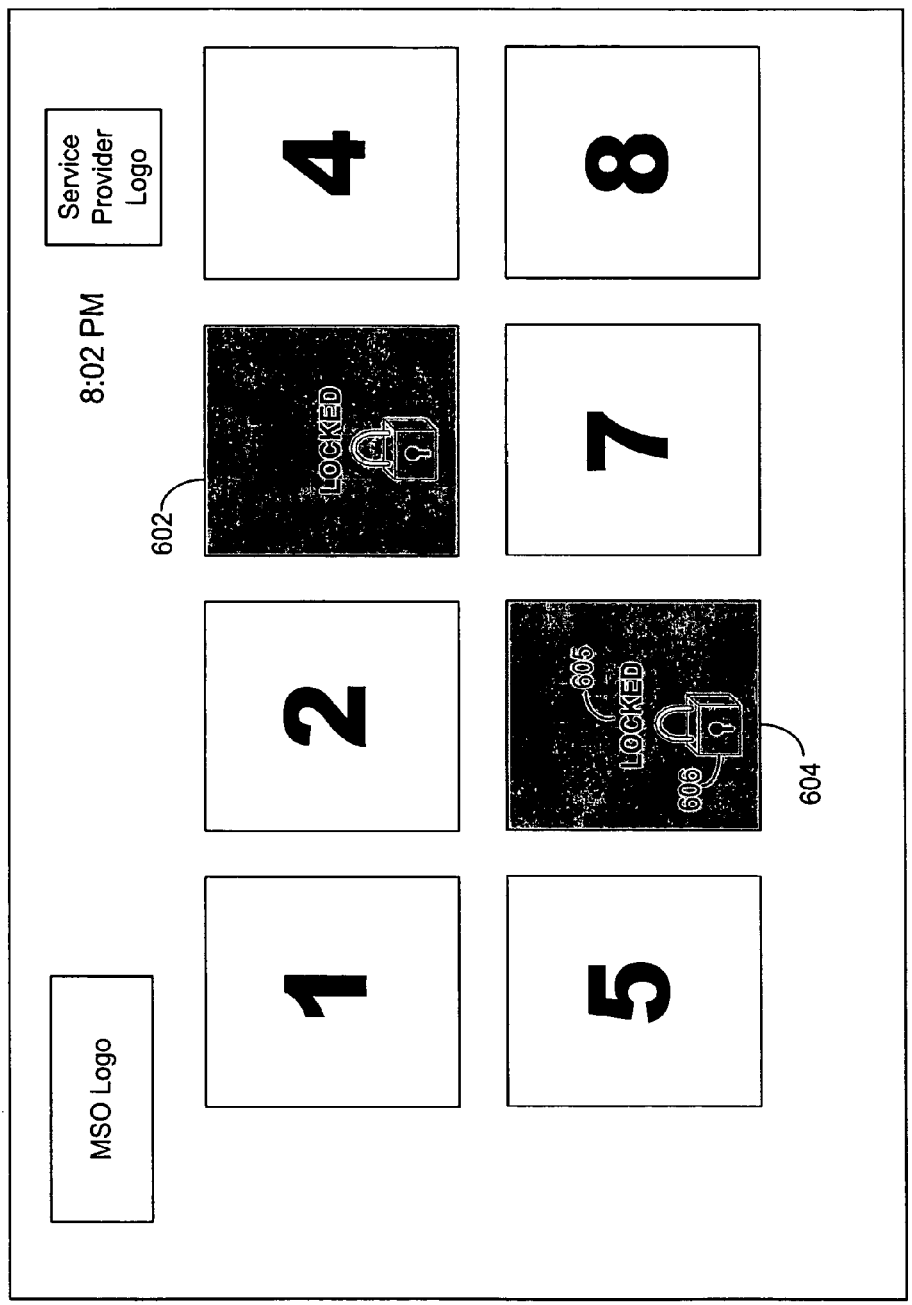
FIG. 6 is an illustrative display screen showing locked video windows in a video mosaic screen in accordance with one embodiment of the invention.

FIG. 6 shows locked video windows in video mosaic page 600 in accordance with one embodiment of the invention. Before displaying each element in mosaic page 600, the ICCA may parse screen data received by distribution facility 20 (FIG. 1) to determine the identity or attributes of the video assets in each cell on the page. The screen data may include such information as the number of cells in a page, the location (e.g., the x and y coordinates) of each cell, the sizes and shapes of each cell, etc. When a user tunes to a broadcast channel or video service, such as a PPV or VOD service, the VRN client (or the ICCA) may first determine whether the channel or video stream includes screen data. This determination may be made automatically, or performed only when the channel or stream is identified as a remotely-generated mosaic channel or stream. If the channel or video stream does not have associated screen data, the VRN client may continue to monitor the channel or stream to detect such data if it subsequently becomes available. Once screen data becomes available, the data is parsed and the individual screen elements are identified.

In some embodiments, the screen data includes unique identifying information for each cell in mosaic page 600. The ICCA may then use this unique identifying information to look up parental control information from a network location or content source (e.g., content source 12 or 24, both of FIG. 1). Alternatively, parental control information may be cached locally to the user equipment in a database or other suitable local storage location. The parental control information looked up from the network location, content source, or database may include any suitable asset information needed to determine if the asset is locked by one or more parental control locks in force on the user equipment. For example, parental control information may include ratings information, title information, channel information, or any other suitable asset information.

In some embodiments, the screen data may include a parental control flag data structure for each selectable element in mosaic page 600. Several fields may be defined in the parental control flag structure, including a source identifier, a rating, and a title. The parental control lock structure is described in more detail below in regard to FIG. 13. In some embodiments, video assets without parental control information (e.g., without corresponding screen data defining the asset's parental control information) are locked by default. In other embodiments, parental controls are not applied to such assets.

When the ICCA determines that one or more elements in a video mosaic page should be locked due to a match between identifying information in the screen data and information about local parental control settings, the ICCA may mask, or blank out, those elements with a graphic, icon, text, or logo. For example, locked cells 602 and 604 are masked with a gray box and a "Locked" label. The location of the mask may be determined from the received screen data. For example, the screen data may define the x and y coordinates of each cell, the cell size, shape, and/or any other property of the cells in display 600.

Figure 9:
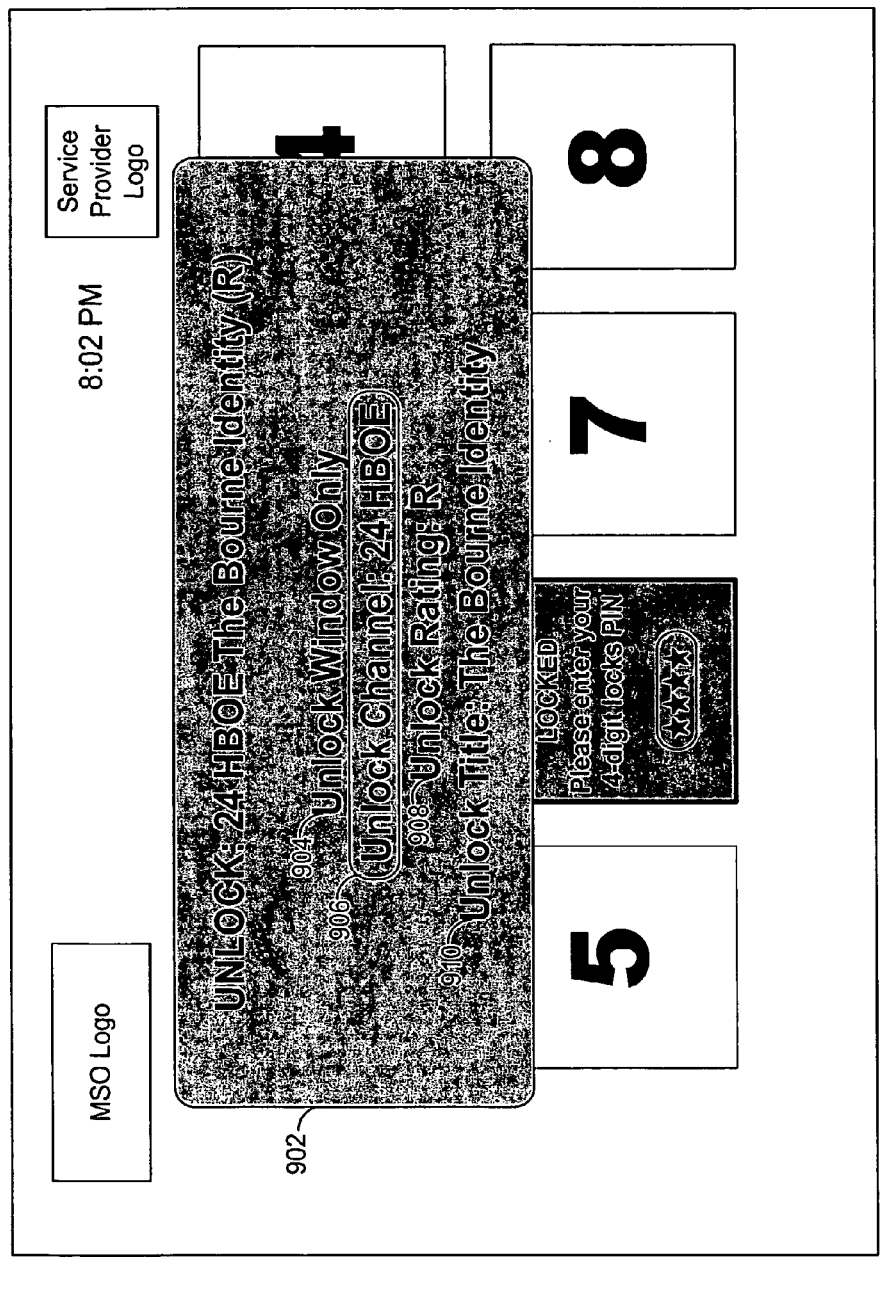
FIG. 9 is an illustrative display screen showing unlock options for a locked video window in accordance with one embodiment of the present invention.
Figure 10:
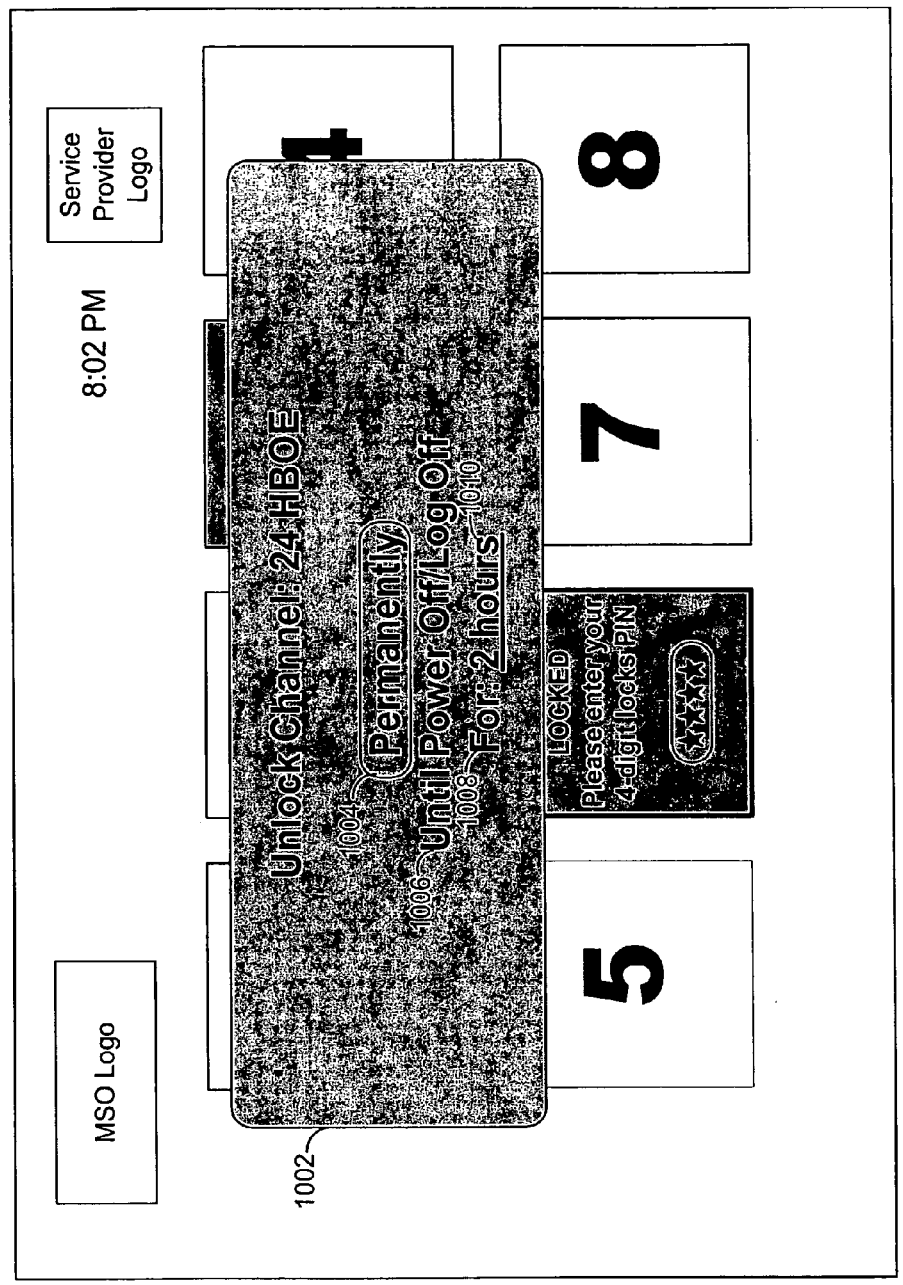
FIG. 10 is an illustrative display screen showing temporal options for the unlock options of FIG. 9 in accordance with one embodiment of the present invention.
Figure 11:
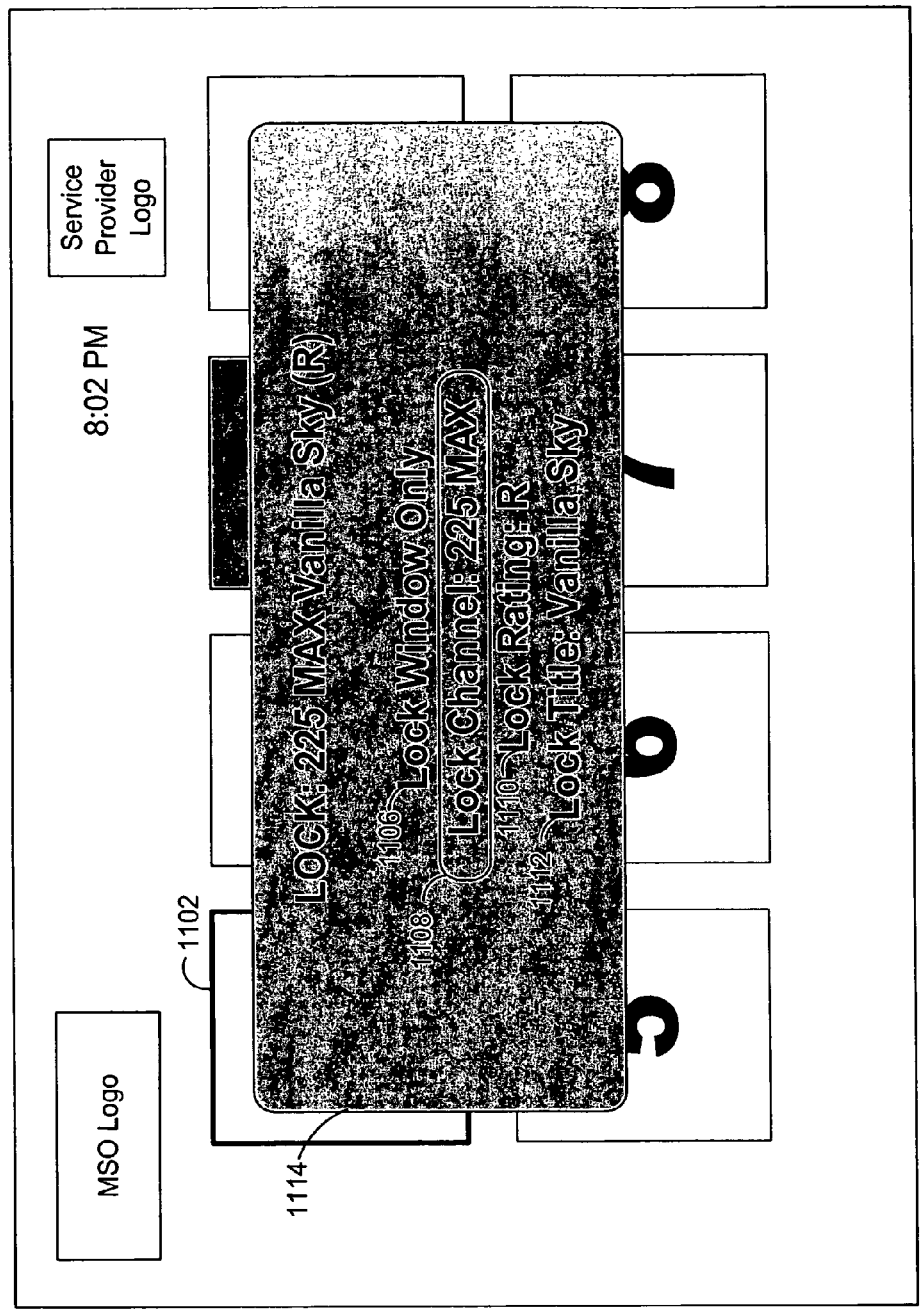
FIG. 11 is an illustrative display screen showing lock options for an unlocked video window in accordance with one embodiment of the present invention.

The screen data may also define control data for each cell. The control data (also referred to herein as action data) may define actions associated with a user selection of a cell. For example, the control data may instruct the VRN client to link the user to a broadcast channel or to order a VOD or PPV asset upon selection of a cell. For cells locked by parental controls, the control data may be redefined or supplemented by the ICCA so that one or more new actions are defined upon a user selection of a locked or masked cell. Similarly, the ICCA may redefine or supplement the control data so that one or more new actions are defined upon the selection of an unlocked cell. For example, as shown in display screen 800 (FIG. 8), the control data may instruct the VRN client or ICCA to present a parental control access code input upon the user selection of a locked cell. The ICCA may also redefine or supplement the control data so that a series of lock/unlock overlays and prompts are presented to the user upon selection of a cell, as shown in FIGS. 9-11. The ICCA may also redefine or supplement the control data so that any other suitable action occurs upon the user selection of a cell.

In addition to masking the area of locked cells in display screen 600, the ICCA may also block the audio associated with any locked cells (if any). For example, the audio associated with an unlocked cell may be automatically selected when the cell is highlighted, while the audio may be muted or alternative audio may be selected when a locked cell is highlighted. Locked cells may also be at least partially masked with one or more of text label 605 and graphic 606. For example, graphic 606 may include a key or key and lock icon, and text label 605 may read "Locked."

Figure 7:
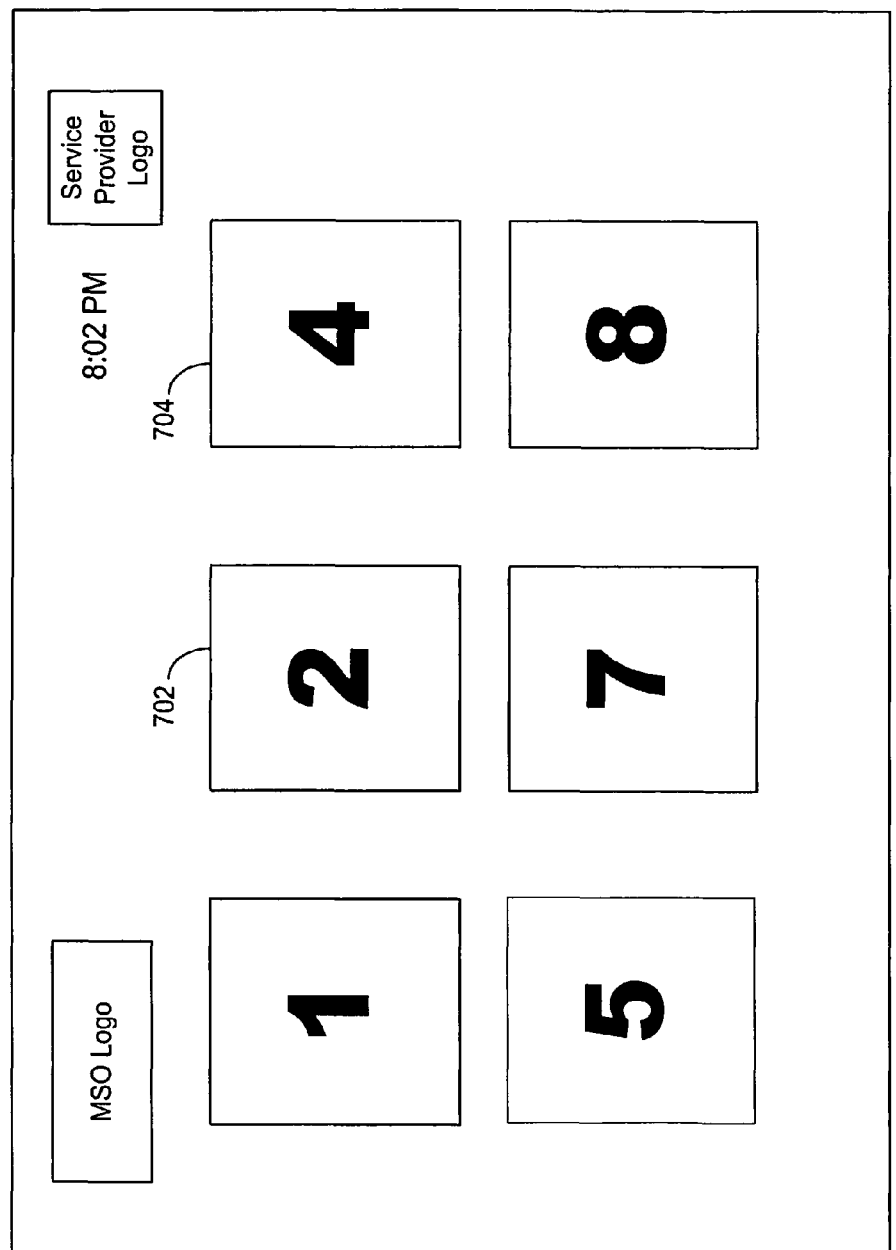
FIG. 7 is an illustrative display screen without the locked video windows of FIG. 6 in accordance with one embodiment of the present invention.

In some embodiments, locked elements in a video mosaic page are removed from the page before presentation of the page to the user. The ICCA may then dynamically recreate or rerender the mosaic page without the locked elements, if desired. As shown in FIG. 7, this may create the appearance that the locked elements never existed. For example, locked cell 3 is removed from mosaic screen 700 and cells 702 and 704 are now positioned adjacent to one another. Locked cell 6 is similarly removed from the page. In addition to removing the locked elements, the ICCA may recreate the page so that the remaining cells are relocated or repositioned. For example, the remaining cells may appear centered in mosaic screen 700. In some embodiments, the cell size is also dynamically adjusted to compensate for the missing cells. For example if four out of eight cells are locked, the four locked cells may be removed from the display and the size of the remaining four cells may be increased by approximately 50%. In this way, a user may not be aware of locked elements that were dynamically removed in a mosaic page.

If locked cells are completely removed from the page, and the page is rerendered with a change in position of the remaining cells, the ICCA may map incoming screen data and control data to the location of the new cells. Because the incoming screen data may incorrectly reflect the old location of the cells, the ICCA may maintain a table of the original cell locations and the new cell locations. In this way, the ICCA may associate incoming screen data with the correct cell in the newly rendered page. If the locked cells are removed without a change in location of the remaining cells, the ICCA may simply ignore or drop any screen data received for the removed cells.

Figure 8:
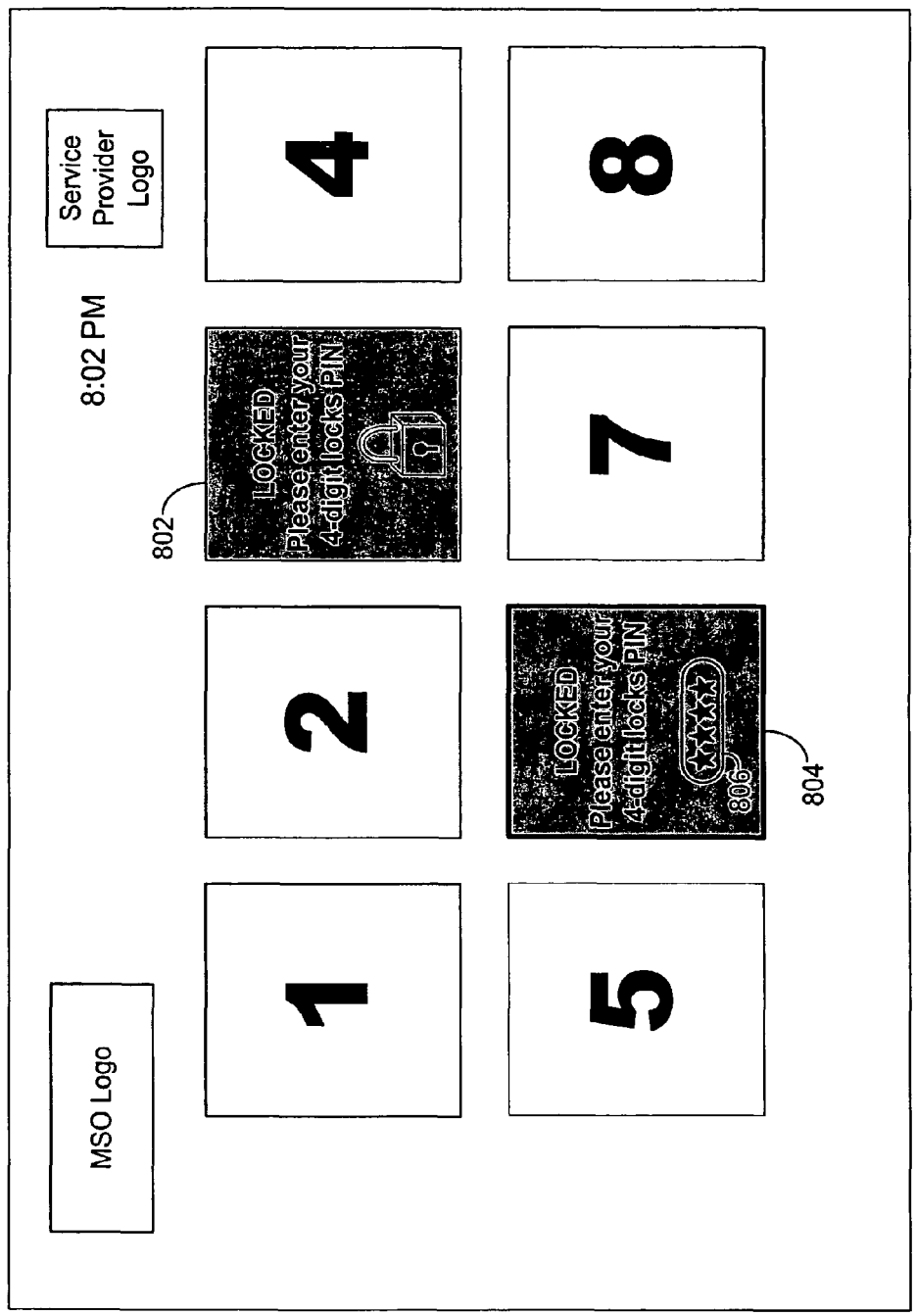
FIG. 8 is an illustrative display screen showing locked video windows with parental control access code entry dialogue prompt in accordance with one embodiment of the present invention.

FIG. 8 shows illustrative mosaic page 800 with locked cells and a parental control access code input. Upon selecting locked cell 804, the user may be given an opportunity to unlock the cell by entering a valid parental control access code into input 806. Unselected locked cell 802 may not include a parental control access code input until the cell is highlighted or selected. The user may input a parental control access code using input device 38 (FIG. 1). In some embodiments, multiple locked cells may be unlocked at the same time by selecting more than one cell and then inputting a parental control access code.

Upon successfully inputting a valid parental control access code, the cell may be immediately unblocked or the user may be presented with several unlock options, as shown in FIG. 9. Mosaic page 900 now includes unlock options overlay 902. This overlay may identify the one or more selected cells by one or more of the following attributes: channel name (e.g., "HBOE"), channel number (e.g., "24"), asset title (e.g., "The Bourne Identity"), and asset rating (e.g., "R"). These attributes may identify the locked asset that will be displayed in the locked cell once the cell is unlocked. If multiple cells are selected to be unlocked simultaneously, then unlock options overlay 902 may include multiple overlays displayed consecutively or one large overlay containing the attribute information for each selected cell to be unlocked.

Unlock options overlay 902 may contain at least four unlock options. The user may select unlock option 904 to unlock the selected cell window only. Unlocking a cell window only may not affect the parental control settings in force on the user equipment. Rather, unlocking a cell window may merely cause the asset in the cell to be displayed while the video mosaic is displayed. The user may select unlock option 906 to unlock the channel corresponding to the selected cell to be unlocked. The user may select unlock option 908 to unlock the rating associated with the cell to be unlocked. Finally, the user may select option 910 to unlock the title of the asset in the cell selected to be unlocked.

Typically, not all of unlock options 904, 906, 908, and 910 will be available in unlock options overlay 902. For example, if a cell in mosaic page 900 selected to be unlocked was in fact locked only due to a ratings lock (e.g., an "R" movie ratings lock), then, in some embodiments, only unlock ratings option 908 may be displayed in unlock options overlay 902. As another example, if a cell in mosaic page 900 was locked only due to a channel lock (e.g., a lock on channel "HBOE"), then only unlock channel option 906 may be displayed to the user in unlock options overlay 902. In some embodiments, unlock option 904 to unlock the window may always be present.

Upon selecting any unlock option from unlock options overlay 902, the user may be presented with temporal options overlay 1002, as shown in mosaic page 1000 of FIG. 10. The options in temporal options overlay 1002 may supplement or further define the unlock option selected in unlock options overlay 902 of FIG. 9. Illustrative temporal options in temporal options overlay 1002 may include unlock permanently option 1004, unlock until power off/log off option 1006, and unlock for a duration option 1008.

Unlock permanently option 1004 may remove a parental control lock permanently (i.e., until the lock is manually reinstated). For example, if unlock channel option 906 is selected and then unlock permanently option 1004 is selected, the lock on the specified channel may be removed completely. This, of course, does not prevent the lock from being reinstated at a later time. A user may select unlock until power off/log off option 1006 to enforce the removed lock only until the user equipment is powered down, restarted, or the current user logs off. A user may also select unlock for duration option 1008 to remove a parental control lock for a user-defined amount of time. The user may customize the amount of time to remove the lock by changing duration option 1010. In some embodiments, duration option 1010 defaults to a reasonable duration, such as two hours. An internal timer or clock within the user equipment may be used to implement the duration setting.

Upon selecting an option from unlock options overlay 902 of FIG. 9 and, optionally, temporal options overlay 1002 of FIG. 10, the ICCA may remove the appropriate lock for the selected duration. Additionally, in some embodiments, the lock may be perpetuated to the main parental control locks on the system, as described in more detail in FIG. 15, below. In other embodiments, video mosaic or VRN parental control locks are maintained and enforced separately from other parental control locks on the system. When a user enters a video mosaic or VRN page (such as homepage 400 of FIG. 4), mosaic parental control locks may be enforced, while when the user is accessing traditional content (e.g., a broadcast television program, movie, or recorded content), system parental control locks may be enforced.

A user may also lock an element or cell in a video mosaic page. FIG. 11 shows illustrative display 1100. Upon selecting any unlocked element in the page (e.g., cell 1102), the user may be presented with lock options overlay 1114. Similar to unlock options overlay 902 (FIG. 9), this overlay may contain at least four lock options: lock window only option 1106, lock channel option 1108, lock rating option 1110, and lock title option 1112. The current asset being displayed in the selected cell to be locked may be identified in lock options overlay 1114 by channel name, channel number, title, and/or rating. As with the unlock options overlay, the user may select any option in lock options overlay 1114 to be presented with a temporal options overlay (not shown) similar to temporal options overlay 1002 (FIG. 10). Thus, locks may also be set permanently, until power off/log off, or for a user-defined duration.

Figure 12:
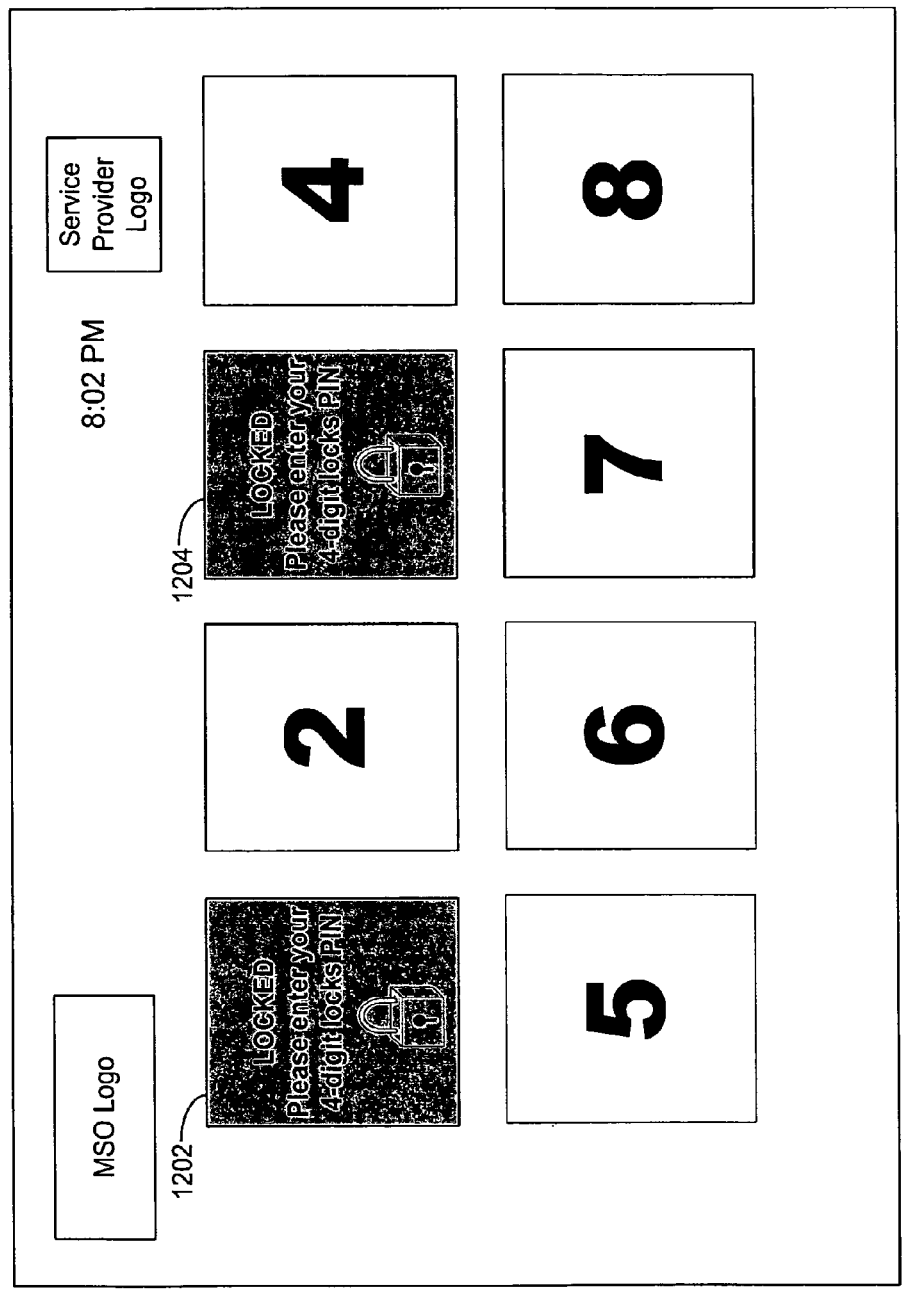
FIG. 12 is an illustrative display screen showing newly locked video windows in accordance with one embodiment of the present invention.

In the example of FIG. 11, the user would like to create a new parental control lock for the channel corresponding to cell 1102. Therefore the user may select or highlight cell 1102 and press a "Lock" key on any available input device. The user then may select lock channel option 1108 (and, optionally, the user may select a lock temporal option) to create the new channel lock. Since the channel corresponding to cell 1102 is now locked, the cell may then be masked. As shown in FIG. 12, cell 1202 of mosaic page 1200 is grayed out. Cell 1204 may remain locked from another parental control lock in force on the system.

Figure 13:
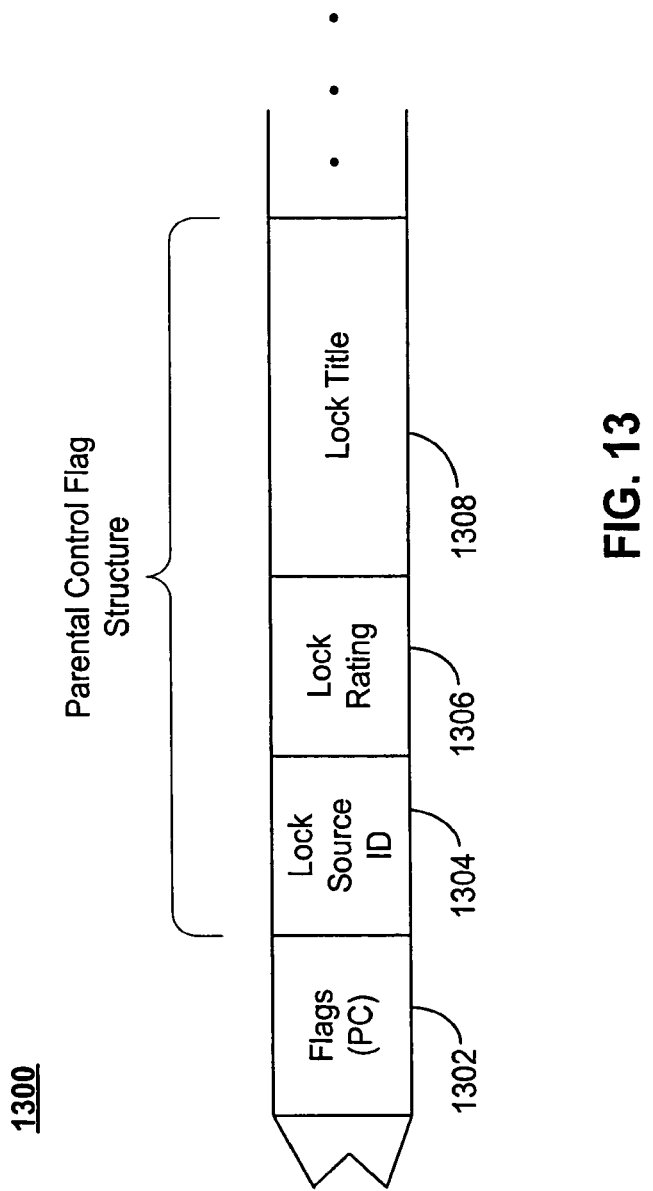
FIG. 13 shows an illustrative parental control flag structure in accordance with one embodiment of the present invention.

The ICCA may parse screen data in order to identify the elements in a video mosaic page. Each "chunk" of screen data may be associated with a specific video asset in a video mosaic page or with any other set or subset of the screen data. For a further description of the screen data chunks and an illustrative object definition, see U.S. patent application Ser. No. 11/395,380, filed Mar. 30, 2006, which is hereby incorporated by reference herein in its entirety. FIG. 13 shows illustrative parental control flag structure 1300 in accordance with one embodiment of the invention. The screen data object definition may include 16-bit flag value 1302, which determines if a parental control flag structure ("PC") is included in the object. Flag value 1302 may also indicate which parental control structures are included. If flag value 1302 indicates that PC is set, one or more parental control flag structures may be included in the object definition.

In the example of FIG. 13, the parental control flag structure includes lock source identifier 1304, lock rating 1306, and lock title 1308. These three fields may be used by the ICCA (and the VRN client) implemented on the user equipment to identify the source of each asset displayed in a video mosaic page. In some embodiments, lock source identifier 1304 may be a 16-bit value representing the source (e.g., channel) of the content associated with the object. The ICCA may look up source identifier 1304 in a local channel or source map to identify the asset. The channel or source map may be regularly updated to reflect new asset availability. The ICCA may then use this information to determine if the asset should be locked. For example, if the source identifier indicates that the asset is from a locked channel or that the channel identified by the channel map is currently broadcasting a locked title or an asset with a locked rating, the ICCA may determine that this asset should be locked.

However, some assets may not be included in the local channel map or the asset may not be available via a traditional channel. For example, a video mosaic cell may contain locally recorded content from a DVR or other recording device. A video mosaic cell may also contain an interactive application or game or a video-on-demand asset. These types of assets may not be generally listed in the local channel map or source map. For assets that the rating and/or title cannot be determined solely from lock source identifier 1304, lock rating field 1306 and lock title field 1308 may be provided. Lock rating field 1306 may be a 16-bit value representing the rating (e.g., MPAA rating) of the asset. Lock title field 1308 may hold a text string of 8-bit characters representing the asset's title. Alternatively, any suitable program identifier or asset identifier may be used. For example, this may include the provider ID and asset ID fields as defined in the CableLabs Video-On-Demand Content Specification Version 2.0.

The ICCA may parse these fields and reevaluate the parental control criteria at regular intervals. At a minimum, the criteria should be reevaluated at each program or asset boundary on the source. In some embodiments, the ICCA reevaluates parental control information more regularly. For example, the ICCA may parse new parental control data every minute, every few seconds, or as new screen data is received by the user equipment, if desired.

Figure 14:
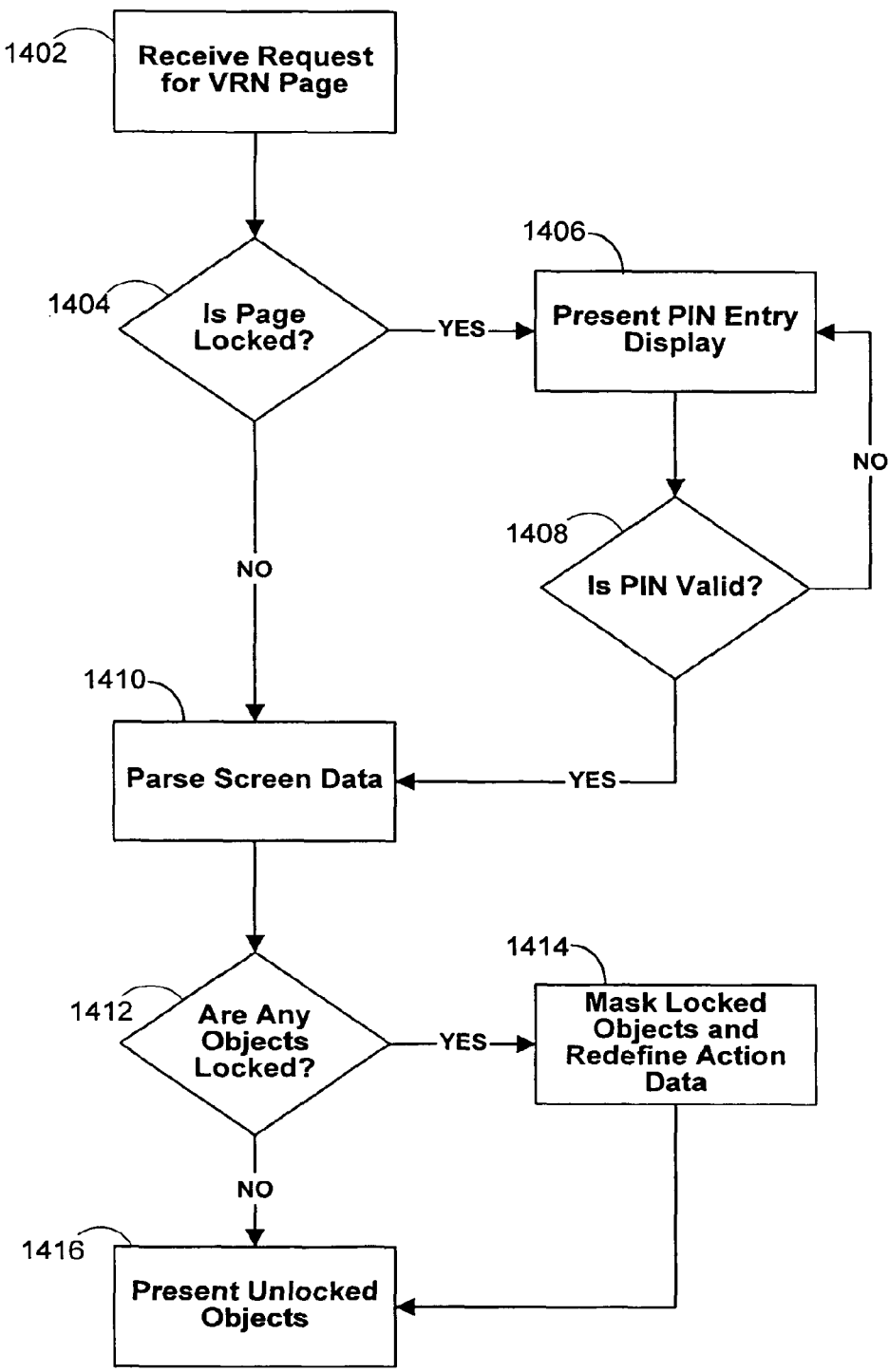
FIG. 14 shows an illustrative process for presenting a video mosaic screen to a user in accordance with one embodiment of the present invention.

FIG. 14 shows illustrative process 1400 for presenting a video mosaic or VRN page to the user. At step 1402, a user request is received for a video mosaic page. For example, a user may press the "Homepage" key on input device 38 (FIG. 1) to request the VRN homepage 400 (FIG. 4). At step 1404, the ICCA may determine if the requested page is locked. For example, homepage 400 (FIG. 4) may be accessed through a particular channel number. A channel lock may be set on the user equipment to prohibit access to homepage 400 (FIG. 4). If the ICCA determines that the requested page is locked, a parental control access code prompt may be presented to the user a step 1406. For example, prompt 302 (FIG. 3) may be displayed to the user. The parental control access code may be validated at step 1408, and the user may be given another opportunity to input a parental control access code if the previous attempt was invalid.

After a successful parental control access code input or if the requested page was not locked, screen data may be parsed at step 1410. As described above, the screen data may be parsed before presenting a video mosaic page, at regular intervals thereafter, or at any other suitable time (e.g., at program or asset boundaries). After parsing the screen data, at step 1412 the ICCA may determine if any objects are locked on the page due to parental controls. If there are no locked elements, all elements of the page may be presented to the user at step 1416. For example, step 1416 may correspond to the display of homepage 400 (FIG. 4). If, at step 1412, the ICCA determines that there are locked elements on the page, these elements may be masked or blocked at step 1414. For example, a black or gray mask or button may be placed over the locked element, as shown in locked cell 604 (FIG. 6). This mask may include text, such as text 605, a graphic, such as icon 606, or any other suitable feature. In addition, the action or control data associated with the locked elements may be redefined or supplemented at step 1414. For example, the action data may be redefined to present a parental control access code prompt upon user selection of the locked or masked cells.

The locked elements of the page may also be converted into selectable buttons with a parental control access code inputs, such as input 806 of locked cell 804 (FIG. 8). This allows a user to immediately input a valid parental control access code to unlock the locked cell. In some embodiments, a notification message (not shown) may inform the user of locked elements before or immediately after a page with locked elements is displayed, at which time the user may enter a parental control access code to unlock all locked elements on the page.

After masking the locked elements of the page at step 1414, the unlocked elements may be presented to the user at step 1416. As shown in FIG. 7, in some embodiments, the locked elements are removed from the page completely. The unlocked cells may then be repositioned or resized so as to give an appearance that no elements are missing from the page.

In practice, one or more steps shown in process 1400 may be combined with other steps, performed in any suitable order, performed in parallel (e.g., simultaneously or substantially simultaneously) or removed. For example, screen data may be parsed at step 1410 before or during validation of a parental control access code at step 1408. In some embodiments, the screen data may even be parsed while the parental control access code prompt is being displayed at step 1406.

Figure 15:
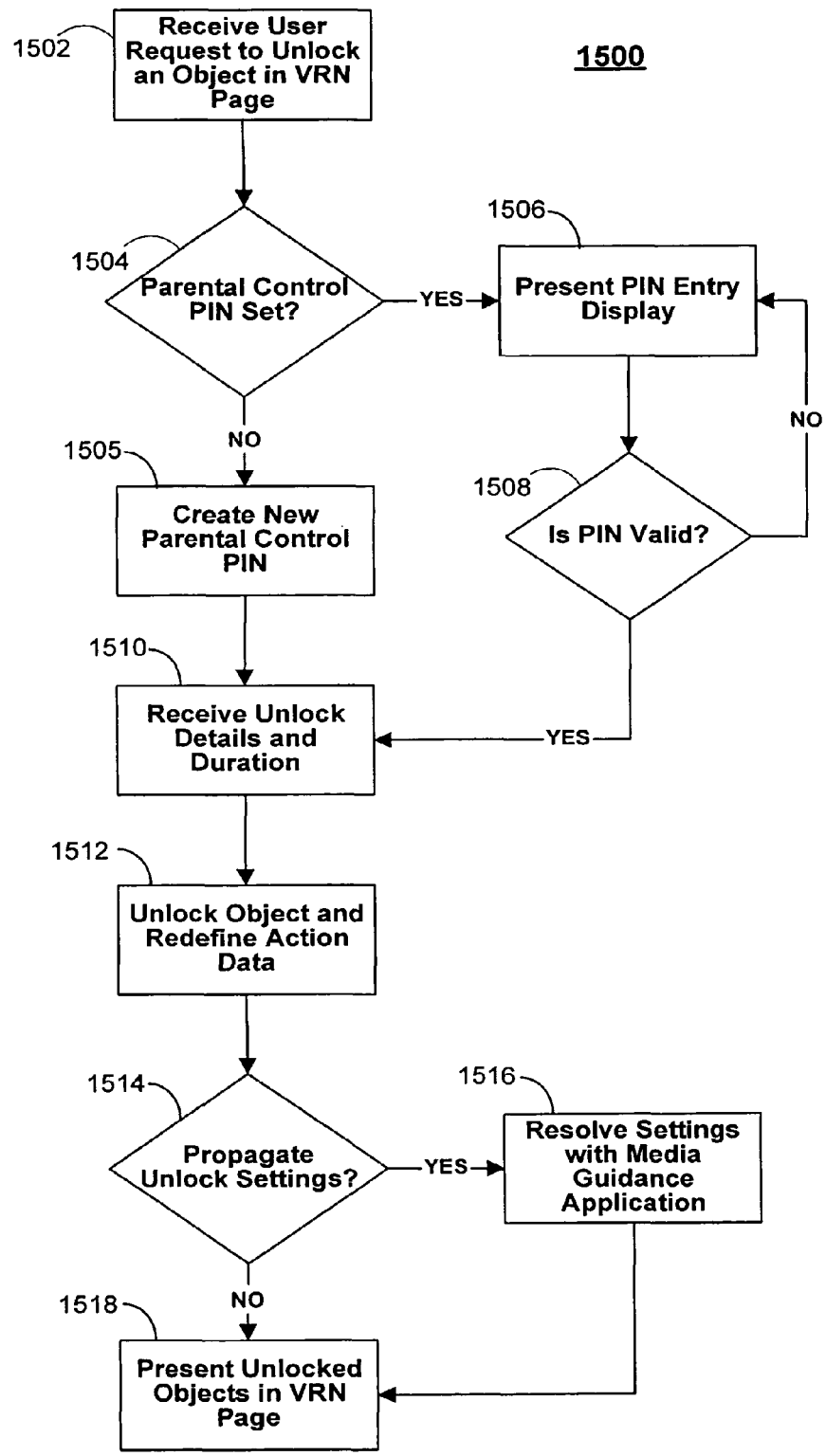
FIG. 15 shows an illustrative process for unlocking a video window within a video mosaic screen in accordance with one embodiment of the present invention.

FIG. 15 shows illustrative process 1500 for removing or disabling a parental control lock from a video mosaic page. At step 1502, the ICCA may receive a request to unlock an element in a video mosaic or VRN page. For example, the user may select a locked element, such as cell 804 shown in FIG. 8. If, at step 1504, a parental control access code is not set, the user may be given am opportunity to create a new parental control access code at step 1505. If a parental control access code is set, the ICCA may present a parental control access code prompt to the user at step 1506 and validate the code at step 1508. For example, the parental control access code prompt may be displayed in a locked cell, as shown in cell 804 (FIG. 8) or an overlay or prompt (such as prompt 302 of FIG. 3) may be presented to the user. After creating a new parental control access code at step 1505 or successfully validating a parental control access code input at step 1508, the user may be presented with various unlock options. For example, overlays 902 (FIG. 9) and 1002 (FIG. 10) may be presented to the user. These overlays may allow the user to unlock the locked cell only, unlock the channel (or source) associated with the cell, unlock the rating associated with the asset in the cell, unlock the title associated with the asset in the cell, or any other suitable action.

The user may additionally be given an opportunity to select a duration for the unlock action. For example, overlay 1002 (FIG. 10) allows the user to remove a lock permanently, until power off of the user equipment, until the user logs off, or any user-specified duration (e.g., 2 hours). The ICCA receives the unlock options and optional duration at step 1510, and the object is unlocked at step 1512. In addition, the action or control data associated with the newly unlocked element or elements may be redefined or supplemented at step 1512. For example, the action data may be redefined to the original unlocked state, where a user may be presented with a video asset upon selection of a cell.

In some embodiments, VRN or video mosaic parental control locks are maintained separately from system parental control locks (e.g., the parental control locks established via a traditional IMGA). In other embodiments, there exists only one "master" set of parental control locks. At step 1514, the ICCA determines if the unlock action should be propagated. If so, at step 1516 the unlock action is resolved with the main set of parental control locks in force on the user equipment (or some other set of parental control locks, e.g., a set of user-specific locks). After the locks are resolved or the determination is made not to propagate the unlock action, the VRN or video mosaic page is presented to the user with the newly unlocked objects at step 1518. For example, the newly unlocked objects may be unmasked or otherwise made visible to the user. The objects' associated audio may likewise be accessible to the user.

In practice, one or more steps shown in process 1500 may be combined with other steps, performed in any suitable order, performed in parallel (e.g., simultaneously or substantially simultaneously) or removed. For example, in some embodiments, the user may not be prompted for unlock source or duration, and the content may be unlocked only within the mosaic cell for the duration of the display of the mosaic, without propagating the lock change.

Figure 16:
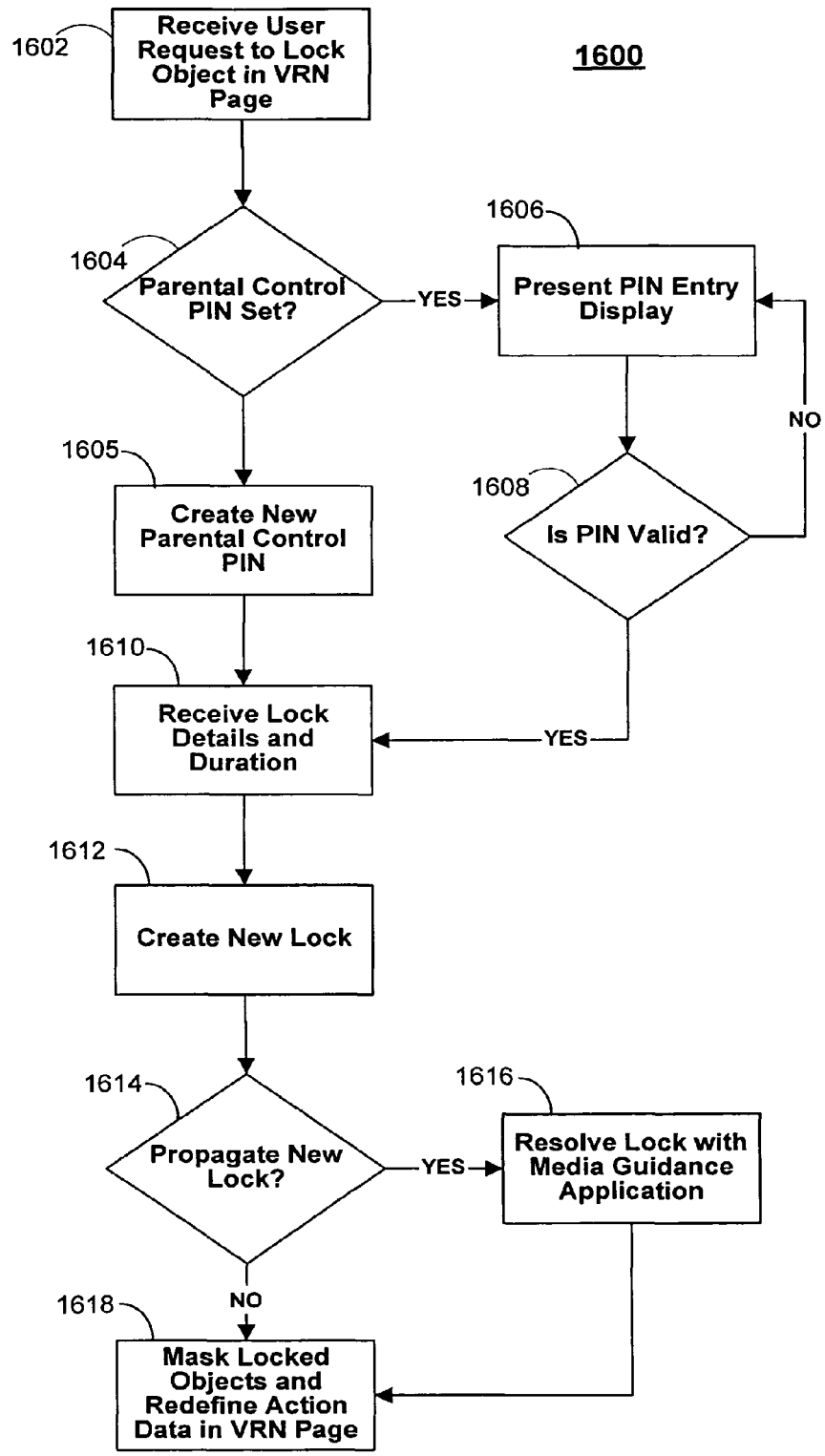
FIG. 16 shows an illustrative process for locking a video window within a video mosaic screen in accordance with one embodiment of the present invention.

FIG. 16 shows illustrative process 1600 for creating or enabling a parental control lock from a video mosaic page. At step 1602, the ICCA may receive a request to lock an element in a video mosaic or VRN page. For example, the user may select an unlocked element, such as cell 1102 shown in FIG. 11 and press a predefined key such as a lock key on user input device 38 (FIG. 1). If, at step 1604, a parental control access code is not set, the user may be given an opportunity to create a new parental control access code at step 1605. If a parental control access code is set, the ICCA may present a parental control access code prompt to the user at step 1606 and validate the code at step 1608. For example, an overlay or prompt (such as prompt 302 of FIG. 3) may be presented to the user. After creating a new parental control access code at step 1605 or successfully validating a parental control access code input at step 1608, the user may be presented with various lock options. For example, overlay 1104 (FIG. 11) may be presented to the user. This overlay may allow the user to lock the unlocked cell only, lock the channel (or source) associated with the cell, lock the rating associated with the asset in the cell, lock the title associated with the asset in the cell, or any other suitable action.

The user may additionally be given an opportunity to select a duration for the lock action. For example, overlay 1002 (FIG. 10) shows comparable options for an unlock action. The user may enable the lock permanently, until power off of the user equipment, until the user logs off, or any user-specified duration (e.g., 2 hours). The ICCA receives the lock options and optional duration at step 1610, and a new lock may be created at step 1612 based on the options received at step 1610.

As described above, in some embodiments, the user may wish to propagate parental control settings to another set of parental control locks. At step 1614, the ICCA determines if the lock action should be propagated. If so, at step 1716 the lock action is resolved with the main set of parental control locks in force on the user equipment (or some other set of parental control locks, e.g., a set of user-specific locks). After the locks are resolved or the determination is made not to propagate the lock action, the VRN or video mosaic page is presented to the user with the newly locked objects masked at step 1618. For example, the newly locked objects may be grayed out or otherwise hidden from the screen as shown in display 600 (FIG. 6). The objects' associated audio may likewise be inaccessible to the user. In addition, the action or control data associated with the newly locked objects may be redefined or supplemented at step 1618. For example, the action data may be redefined to present a parental control access code prompt upon user selection of the masked objects.

In practice, one or more steps shown in process 1600 may be combined with other steps, performed in any suitable order, performed in parallel (e.g., simultaneously or substantially simultaneously) or removed.

The above described embodiments of the present invention are presented for purposes of illustration and not of limitation, and the present invention is limited only by the claims which follow. For example, the description herein may refer to the ability to lock and unlock a video cell within a mosaic page. In some embodiments, this may include the ability to lock an unlock other types of assets and controls on the mosaic page, such as menu option button.

What is claimed is:

1. A method for displaying assets in a video mosaic, the method comprising:
   receiving a first user request to change a parental control lock status of a channel;
   in response to receiving the first user request, while a first video mosaic is displayed, determining that a first video asset in the first video mosaic is associated with the channel, wherein the first video mosaic includes a first plurality of videos that includes the first video asset;
   causing a second video mosaic to be automatically displayed, wherein the causing comprises at least one of masking and unmasking the video asset in the second video mosaic, wherein the second video mosaic includes a second plurality of videos that includes the first video asset;
   receiving a second user request to change a parental control lock status of a second video asset;
   in response to receiving the second user request, determining a reason for a current parental control lock status of the second video asset; and
   causing to be displayed an unlock option based on the determining.

2. The method of claim 1, wherein the parental control lock status is based on at least one of a source identifier, a channel identifier, a rating, and a title.

3. The method of claim 1, wherein video assets in the first video mosaic screen are selected from a group consisting of a live broadcast program, a video-on-demand (VOD) asset, a pay-per-view (PPV) asset, a digital video recorder (DVR) asset, a Webcast, a preview, an advertisement, an interactive game, and an interactive application.

4. The method of claim 1, wherein the masking the first video asset comprises removing the first video asset from the first video mosaic.

5. The method of claim 1, further comprising one of repositioning and resizing video assets in the second video mosaic screen in response to receiving the user request.

6. The method of claim 1, wherein masking the first video asset comprises causing one or an icon, text, and graphic to be displayed in place of the first video asset.

7. The method of claim 1, wherein masking the first video asset comprises masking the first video asset in response to receiving a parental control access code input.

8. The method of claim 1, wherein the user request is a request to unlock the channel.

9. The method of claim 8, further comprising:
   causing a parental control access code prompt to be displayed in response to receiving the user request to unlock the channel;
   receiving a user input in response to displayed prompt; and
   validating the received user input.

10. The method of claim 8, wherein the user request to unlock the channel is a user request to unlock at least one rating associated with the channel.

11. The method of claim 8, wherein the user request to unlock the channel is a user request to unlock at least one title associated with the channel.

12. The method of claim 1, wherein the user request is a user request to lock the channel.

13. The method of claim 12, further comprising:
   causing a parental control access code prompt to be displayed in response to receiving the user request to lock the channel;
   receiving a user input in response to displayed prompt; and
   validating the received user input.

14. The method of claim 12, wherein the user request to lock the channel is a user request to lock at least one rating or title associated with the channel.

15. The method of claim 1, further comprising redefining screen data associated with the first video asset in response to receiving the user request to change the parental control lock status of the channel.

16. The method of claim 15, wherein the screen data defines actions in response to a user selection of at least one of the plurality of video assets in the first video mosaic.

17. The method of claim 16, wherein at least one of the first video mosaic and the second video mosaic is generated remotely from the user.

18. The method of claim 1, wherein the parental control lock status is changed for a predetermined duration of time.

19. The method of claim 1, further comprising:
   receiving a third user request to change a parental control lock status of a third video asset; and in response to receiving the third user request, causing to be displayed an unlock option to change the parental control lock status of the channel.

20. A system for displaying assets in a video mosaic, the system comprising:
input interface circuitry; and
control circuitry configured to:
receive, via the input interface circuitry, a first user request to change a parental control lock status of a channel;
in response to receiving the first user request, while a first video mosaic is displayed, determine that a first video asset in the first video mosaic is associated with the channel, wherein the first video mosaic includes a first plurality of videos that includes the first video asset;
cause a second video mosaic to be automatically displayed, wherein the causing comprises at least one of masking and unmasking the first video asset in the second video mosaic, wherein the second video mosaic includes a second plurality of videos that includes the first video asset;
receive, via the input interface circuitry a second user request to change a parental control lock status of a second video asset;
in response to receiving the second user request, determining a reason for a current parental control lock status of the second video asset; and
cause to be displayed an unlock option based on the determining.

21. The system of claim 20, wherein the parental control lock status is based on at least one of a source identifier, a channel identifier, a rating, and a title.

22. The system of claim 20, wherein video assets in the first video mosaic screen are selected from a group consisting of a live broadcast program, a video-on-demand (VOD) asset, a pay-per-view (PPV) asset, a digital video recorder (DVR) asset, a Webcast, a preview, an advertisement, an interactive game, and an interactive application.

23. The system of claim 20, wherein the masking the first video asset comprises removing the first video asset from the first video mosaic.

24. The system of claim 20, wherein the control circuitry is further configured to reposition and resize video assets in the second video mosaic screen in response to receiving the user request.

25. The system of claim 20, wherein masking the first video asset comprises causing one or an icon, text, and graphic to be displayed in place of the first video asset.

26. The system of claim 20, wherein masking the first video asset comprises masking the first video asset in response to receiving a parental control access code input.

27. The system of claim 20, wherein the user request is a request to unlock the channel.

28. The system of claim 27, wherein the control circuitry is further configured to:
cause a parental control access code prompt to be displayed in response to receiving the user request to unlock the channel;
receive a user input in response to displayed prompt; and
validate the received user input.

29. The system of claim 27, wherein the user request to unlock the channel is a user request to unlock at least one rating associated with the channel.

30. The system of claim 27, wherein the user request to unlock the channel is a user request to unlock at least one title associated with the channel.

31. The system of claim 20, wherein the user request is a user request to lock the channel.

32. The system of claim 31, wherein the control circuitry is further configured to:
cause a parental control access code prompt to be displayed in response to receiving the user request to lock the channel;
receive a user input in response to displayed prompt; and
validate the received user input.

33. The system of claim 31, wherein the user request to lock the channel is a user request to lock at least one rating or title associated with the channel.

34. The system of claim 20, wherein the control circuitry is further configured to redefine screen data associated with the first video asset in response to receiving the user request to change the parental control lock status of the channel.

35. The system of claim 34, wherein the screen data defines actions in response to a user selection of at least one of the plurality of video assets in the first video mosaic.

36. The system of claim 35, wherein at least one of the first video mosaic and the second video mosaic is generated remotely from the user.

37. The system of claim 20, wherein the parental control lock status is changed for a predetermined duration of time.

38. The system of claim 20, wherein the control circuitry is further configured to:
receive a third user request to change a parental control lock status of a third video asset; and
in response to receiving the third user request, cause to be displayed an unlock option to change the parental control lock status of the channel.

* * * * *